(12) United States Patent
Ro et al.

(10) Patent No.: US 11,460,882 B2
(45) Date of Patent: Oct. 4, 2022

(54) METHOD AND APPARATUS FOR PERFORMING DISPLAY IN ELECTRONIC DEVICE

(71) Applicant: SAMSUNG ELECTRONICS CO., LTD., Suwon-si (KR)

(72) Inventors: Kyung-Wook Ro, Seoul (KR); Munhwi Kim, Seoul (KR); Jeong-Won Ko, Seoul (KR); Joonhwan Kim, Yongin-si (KR); Hye-Jin Kim, Seoul (KR); Myoung-Soo Park, Hwaseong-si (KR); Jungwoo Shin, Seoul (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 484 days.

(21) Appl. No.: 16/326,482

(22) PCT Filed: Jun. 30, 2017

(86) PCT No.: PCT/KR2017/006934
§ 371 (c)(1),
(2) Date: Feb. 19, 2019

(87) PCT Pub. No.: WO2018/034427
PCT Pub. Date: Feb. 22, 2018

(65) Prior Publication Data
US 2021/0089081 A1 Mar. 25, 2021

(30) Foreign Application Priority Data
Aug. 19, 2016 (KR) .................. 10-2016-0105557

(51) Int. Cl.
*G06F 1/16* (2006.01)
*G06F 3/0481* (2022.01)
*G09F 9/30* (2006.01)

(52) U.S. Cl.
CPC .......... *G06F 1/1622* (2013.01); *G06F 3/0481* (2013.01); *G06F 1/1652* (2013.01); *G09F 9/301* (2013.01)

(58) Field of Classification Search
None
See application file for complete search history.

(56) References Cited

U.S. PATENT DOCUMENTS

2012/0265814 A1* 10/2012 Roussis .................. G06Q 10/10
709/204
2013/0169545 A1* 7/2013 Eaton .................... G06F 1/1649
345/173

(Continued)

FOREIGN PATENT DOCUMENTS

KR  10-2013-0113895    10/2013
KR  10-2014-0034578    3/2014

(Continued)

OTHER PUBLICATIONS

Herkenrath, "TWEND: Twisting and Bending as new Interaction Gesture in Mobile Devices", 2008, CHI 2008 Proceedings—Student Research Competition, URL: https://dl.acm.org/doi/pdf/10.1145/1358628.1358936 (Year: 2008).*

(Continued)

*Primary Examiner* — David H Chu
(74) *Attorney, Agent, or Firm* — Nixon & Vanderhye, P.C.

(57) ABSTRACT

Various examples of the present invention relate to an electronic device employing a flexible display, and an operating method therefor. The electronic device operating method comprises the steps of: detecting a form change of the electronic device; determining an account to be used in the changed form of the electronic device; and displaying a user interface (UI) on the electronic device on the basis of (Continued)

a setting corresponding to the determined account. Other examples are also possible.

19 Claims, 23 Drawing Sheets

(56) References Cited

U.S. PATENT DOCUMENTS

| | | | |
|---|---|---|---|
| 2013/0265221 A1 | 10/2013 | Lee et al. | |
| 2014/0099886 A1* | 4/2014 | Monroe | G06F 3/0487 455/41.1 |
| 2014/0218321 A1 | 8/2014 | Lee et al. | |
| 2014/0298361 A1* | 10/2014 | Cussonneau | G06F 9/541 719/328 |
| 2014/0380186 A1 | 12/2014 | Kim et al. | |
| 2015/0017962 A1* | 1/2015 | Howard | H04L 61/1594 455/418 |
| 2015/0331593 A1* | 11/2015 | Lee | G06F 1/1641 345/667 |
| 2015/0378557 A1 | 12/2015 | Jeong et al. | |

FOREIGN PATENT DOCUMENTS

| | | |
|---|---|---|
| KR | 10-2014-0147497 | 12/2014 |
| KR | 10-2015-0099679 | 9/2015 |
| KR | 10-2015-0132918 | 11/2015 |
| KR | 10-2016-0001602 | 1/2016 |

OTHER PUBLICATIONS

International Search Report for PCT/KR2017/006934, dated Oct. 13, 2017, 7 pages.

Written Opinion of the ISA for PCT/KR2017/006934, dated Oct. 13, 2017, 16 pages.

* cited by examiner

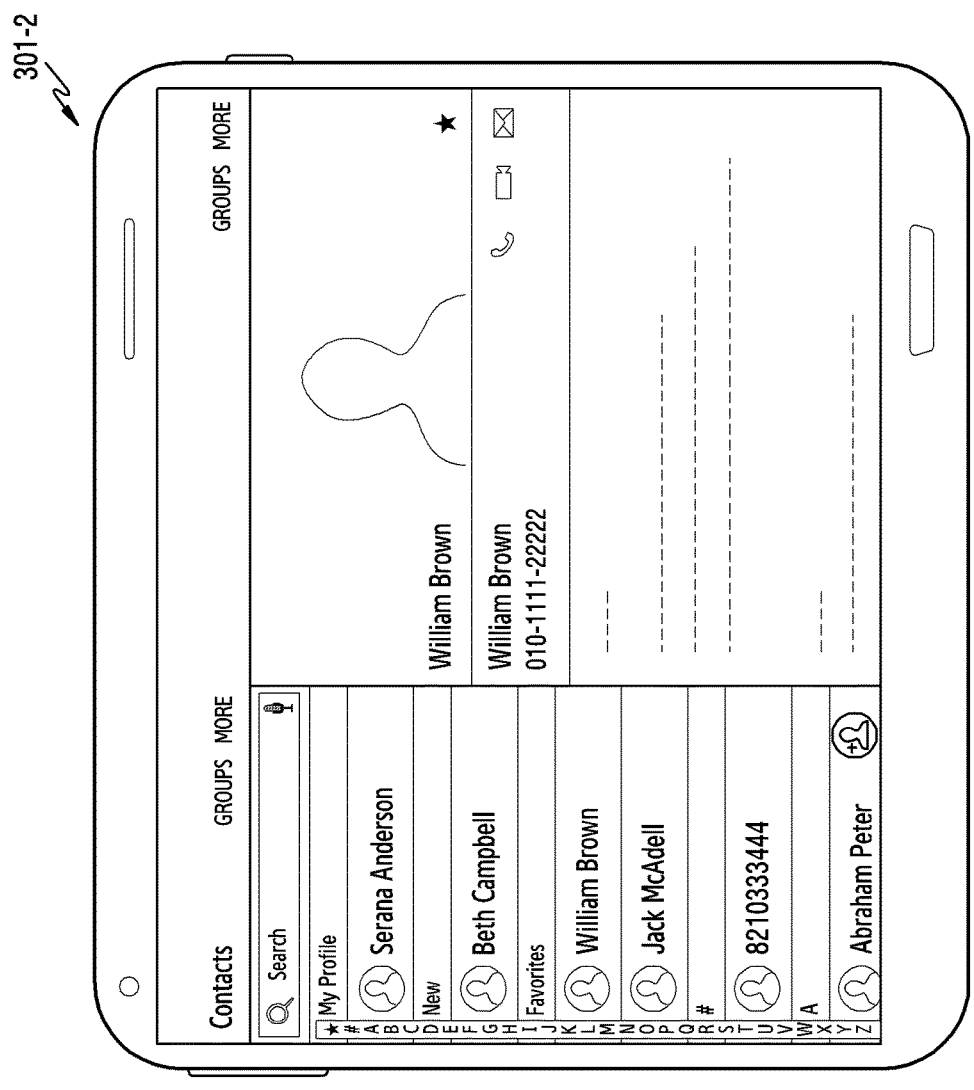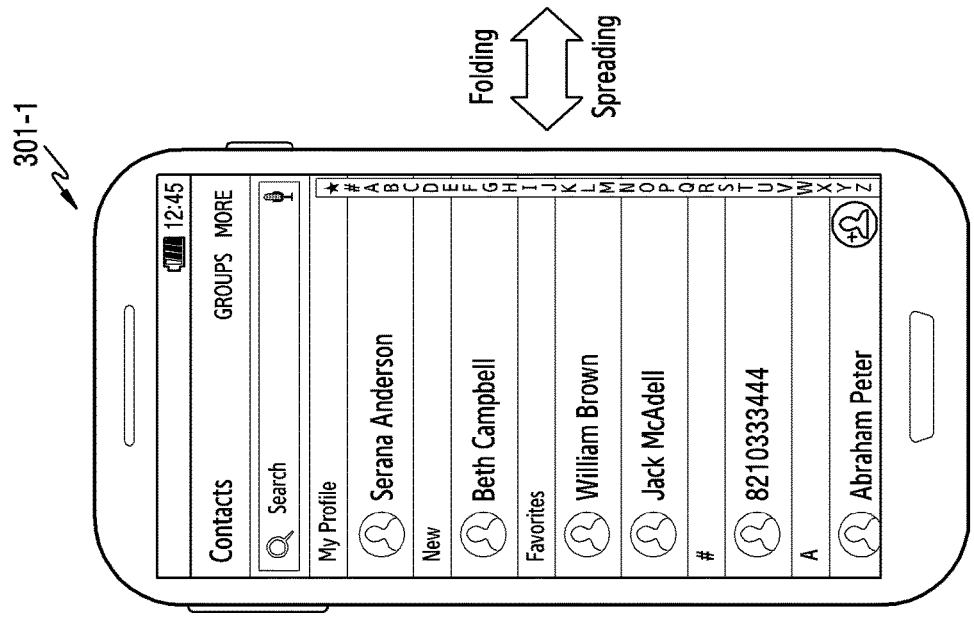
FIG.3

METHOD AND APPARATUS FOR PERFORMING DISPLAY IN ELECTRONIC DEVICE

This application is the U.S. national phase of International Application No. PCT/KR2017/006934 filed 30 Jun. 2017, which designated the U.S. and claims priority to KR Patent Application No. 10-2016-0105557 filed 19 Aug. 2016, the entire contents of each of which are hereby incorporated by reference.

TECHNICAL FIELD

Embodiments of the present disclosure relate to a method and an apparatus for displaying in an electronic device.

BACKGROUND ART

Recent electronic devices are provided with a security function enabling financial services, a multimedia function for enjoying games/videos, and an office work processing function including the Internet, mailing, etc., in addition to a communication function.

In addition, with the enhancement of technology, the electronic devices have become miniaturized/slimmer, and displays mounted on the electronic devices are developing into various forms. As displays, a liquid crystal display (LCD), a plasma display panel (PDP) device, a field emission display (FED) device, an electro luminescence display (ELD) device, an organic light emitting diode (OLED), and the like are developed, and they are developing with the aim of achieving slimness, lightness, and low-power consumption.

In addition, displays are developing to be able to bendable or foldable, and curved type displays are increasingly employed in electronic devices (for example, smartphones, televisions, monitors, wearable devices, or the like).

SUMMARY

Various embodiments provide a method and an apparatus for easily executing a related configuration or function in response to a change of a form of an electronic device, in the electronic device which can have its form changed by employing a flexible display.

An operation method of an electronic device according to an embodiment of the present disclosure includes: detecting a change of a form of the electronic device; determining an account to be used in the changed form of the electronic device; and displaying a user interface (UI) corresponding to a configuration corresponding to the determined account in the changed form, based on the configuration.

An electronic device according to another embodiment of the present disclosure includes: a sensor configured to detect a change of a form of the electronic device; at least one processor configured to determine an account to be used in the changed form of the electronic device; and a display configured to display a user interface on the electronic device based on a configuration corresponding to the determined account.

According to the present disclosure, the electronic device automatically changes an account logged on to the electronic device in response to a change of the form of the electronic device, such that there is an effect of providing various user experiences based on a configuration suitable to each form.

BRIEF DESCRIPTION OF THE DRAWINGS

Embodiments of the present disclosure will be described with reference to the accompanying drawings for more complete understanding. In the drawings, the same reference numerals indicate the same elements.

FIG. 3 is a view illustrating an electronic device employing a flexible display according to various embodiments of the present disclosure;

DETAILED DESCRIPTION OF EXAMPLE EMBODIMENTS

Figure 1:
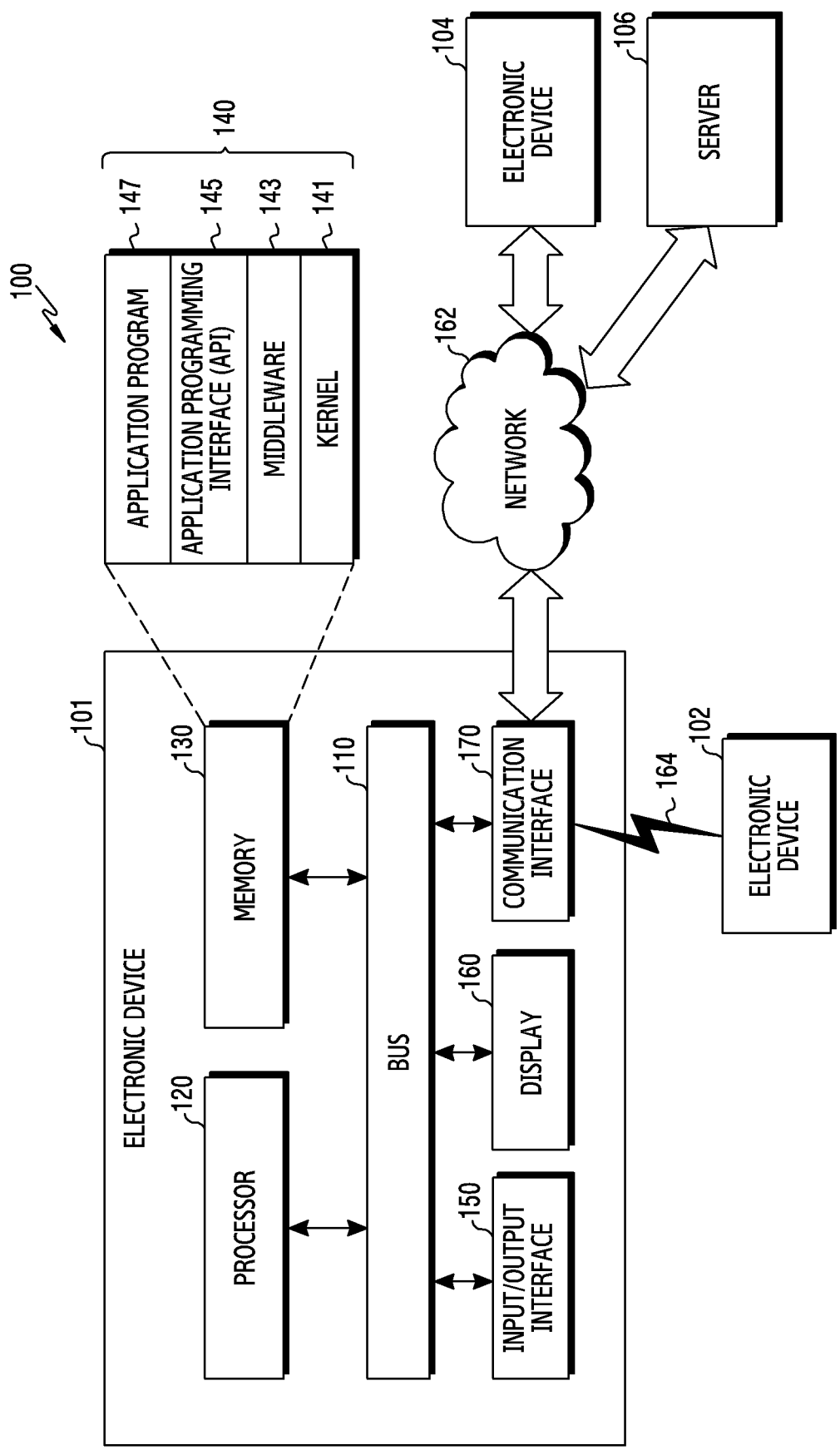
FIG. 1 is a view illustrating an electronic device in a network environment according to various embodiments of the present disclosure.

Hereinafter, various embodiments of the present disclosure will be described with reference to the accompanying drawings. It should be appreciated that various embodiments and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B" or "at least one of A and/or B" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via another element (e.g., a third element).

The term "configured (or set) to . . . " used in the present disclosure may be interchangeably used with the terms "suitable for . . . ," "having the capacity to . . . ," "designed to . . . ," "adapted to . . . ," "made to . . . ," or "capable of . . . ," in a hardware or software level depending on the situation. In a certain situation, the term "a device configured to . . . " may refer to "the device being capable of . . . " with another device or parts. For example, "a processor configured (set) to perform A, B, and C" may refer, for example, and without limitation, to a dedicated processor (for example, an embedded processor) for performing a corresponding operation, or a generic-purpose processor (for example, a central processing unit (CPU) or an application processor (AP)), or the like, for performing corresponding operations by executing one or more software programs stored in a memory device.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices, or the like. According to various embodiments, the wearable devices may include at least one of accessories (for example, watches, rings, bracelets, ankle bracelets, necklaces, glasses, contact lenses, head-mounted-devices (HMDs), etc.), fabric- or clothing-mounted devices (for example, electronic apparels), body-mounted devices (for example, skin pads, tattoos, etc.), bio-implantable circuits, or the like.

FIG. 1 is a diagram illustrating a network environment including an electronic device according to various embodiments;

The electronic device 101 may include a bus 110, a processor 120, a memory 130, an input/output interface 150, a display 160, and a communication interface 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. According to an embodiment, the processor 120 may implemented as a radio frequency integrated circuit (RFIC) module. The processor 120 may corresponds to a processor 210 of FIG. 2.

Also, the processor 120 may determine whether a form of the electronic device 201 is changed by using a result of determining by a state detection sensor 240 N.

Furthermore, the processor 210 may determine whether an account change mode or a subscriber identity module (SIM) change mode is activated in the electronic device 201 and may determine an account and/or a SIM to be used in the electronic device 201. For example, if the form of the electronic device 201 is changed, the processor 201 may determine the account and/or the SIM to be used in the changed form of the electronic device 201. Therefore, the electronic device 201 may change, add or maintain the logged on account of the electronic device 201.

Also, the processor 120 may determines whether a mode change is selected. The mode, for example, may include information regarding a screen configurations suitable for use in various forms of the electronic device 201. The processor 120 may alters a mode regarding the electronic device 201 according to whether the mode change is selected.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The memory 230 may store a configuration corresponding to an account that is logged on to the electronic device 201. A plurality of accounts may be logged on to the electronic device 201, and the memory 230 may store a plurality of configurations corresponding to the plurality of accounts, respectively.

In addition, the memory 230 may store information regarding screen configurations suitable for use in various forms of the electronic device 201. Furthermore, the memory 230 may store information regarding whether the account change mode and/or the SIM change mode is activated in the electronic device 201.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147 and may process one or more task requests. The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

In addition, the display 260 may display a user interface based on a configuration corresponding to an account currently logged on to the electronic device 201. The display 260 may display a pop-up for identifying an account change, a SIM change, or a mode change, and may display a pop-up for indicating a plurality of accounts registered at the electronic device 201.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Bluetooth low energy (BLE), Zigbee, Near Field Communication (NFC), Magnetic Secure Transmission, Radio Frequency (RF) or Body Area Network (BAN). According to an embodiment, the wireless communication may include Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
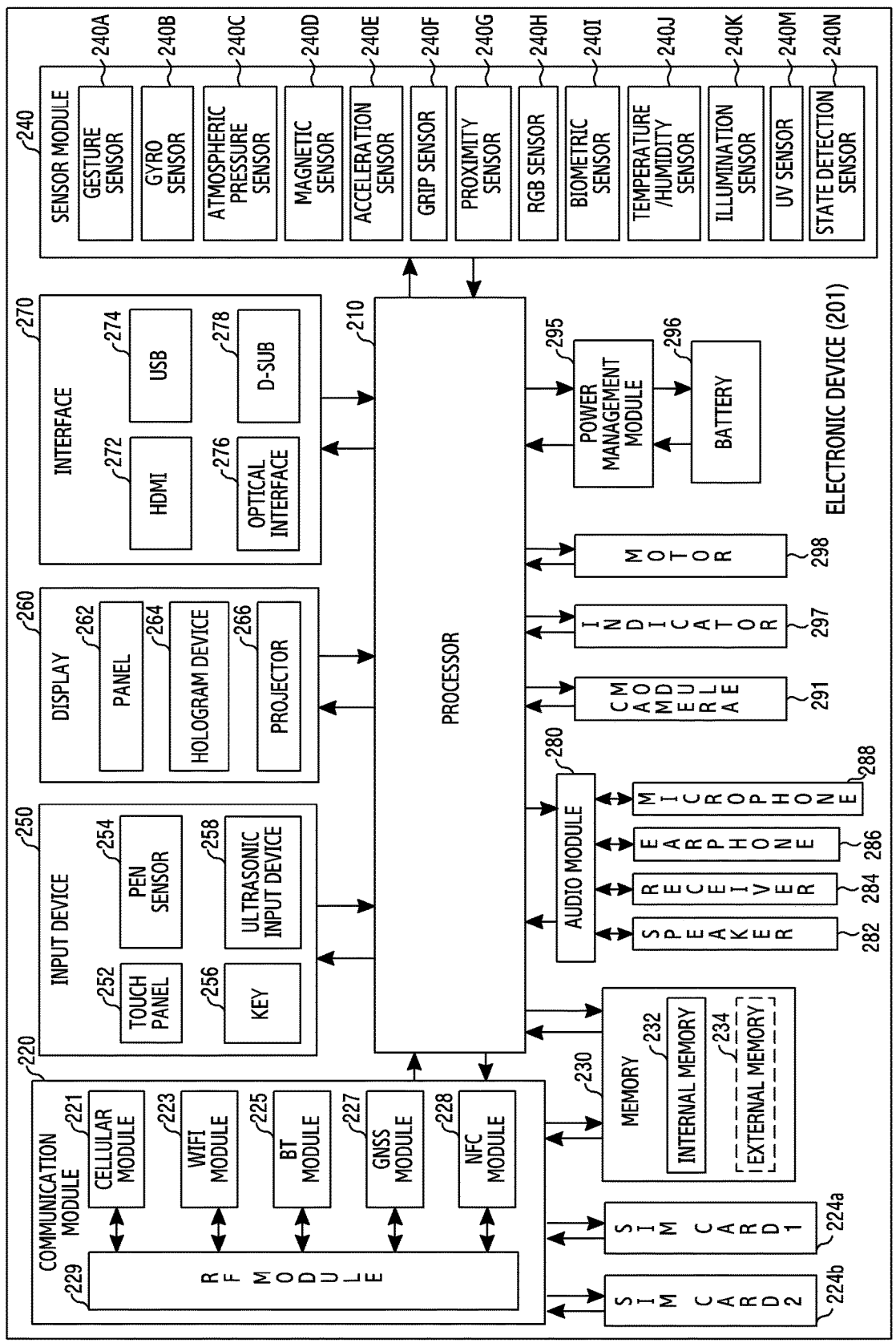
FIG. 2 is a block diagram of an electronic device according to various embodiments of the present disclosure.

FIG. 2 is a block diagram of an electronic device according to various embodiments of the present disclosure.

Referring to FIG. 2, the electronic device 201 may include one or more processors 210 (for example, an AP), a communication module 220, a subscriber identification module 224a, 224b, a memory 230, a sensor module 240, an input device 250, a display 260, an interface 270, an audio module 280, a camera module 291, a power management module 295, a battery 296, an indicator 297, and a motor 298.

The processor 210 may drive an operating system (OS) or an application program to control a plurality of hardware or software elements connected to the processor 210, and may process and compute a variety of data. The processor 210 may be implemented with a System on Chip (SoC), for example. According to an embodiment, the processor 210 may further include a graphic processing unit (GPU) and/or an image signal processor (ISP). The processor 210 may include at least part (for example, the cellular module 221) of the elements illustrated in FIG. 1. The processor 210 may load and process a command or data, which is received from at least one of the other elements (for example, a nonvolatile memory), at a volatile memory, and may store resulting data at a nonvolatile memory.

In addition, the processor 210 may determine whether a form of the electronic device 210 is changed from a first form to a second form or from the second form to the first form, by using a result of determining by a state detection sensor 240N. The first form may refer to a phone form of a bar type like a form 301-1 of FIG. 3, and the second form may refer to a tablet form like a form 301-2 of FIG. 3.

Furthermore, the processor 210 may determine whether an account change mode or a subscriber identity module (SIM) change mode is activated in the electronic device 201. The account change mode or the SIM change mode refers to a mode in which an account or a SIM regarding the electronic device 201 is changed in response to the change of the form of the electronic device 201. The processor 210 may determine an account or a SIM to be used in the electronic device 201 according to the changed form of the electronic device 201. For example, the processor 210 may change or may not change the account or the SIM to be used in the electronic device 201 in response to the change of the form of the electronic device 201 being detected. In addition, the processor 210 may determine an account to be additionally used in addition to a currently used account in the electronic device 201.

Furthermore, the processor 210 may determine whether a mode change is selected. The mode may include information regarding a screen configuration for displaying on the electronic device 201. For example, when the electronic device 201 is in the tablet form, the electronic device 201 may have a screen configuration in which applications are widely distributed on the full tablet display without splitting the screen to be suitable for the display for the tablet form, or may have a screen configuration in which the screen is split, and applications are displayed on one screen and information related to the applications or other information are displayed on the other screen. In addition, the processor 210 may determine whether the mode change is selected, based on an input received from a user. The processor 210 may change or may not change the mode to be used in the electronic device 201, based on a selection on the mode change.

The communication module 220 may be configured the same as or similar to the communication interface 170 of FIG. 1. The communication module 220 may include, for example, a cellular module 221, a WiFi module 223, a Bluetooth module 225, a GNSS module 227, an NFC module 228, and an RF module 229.

The cellular module 221 may provide, for example, voice communication, video communication, a messaging service, an Internet service or the like through a communication network. According to an embodiment, the cellular module 221 may perform discrimination and authentication of the electronic device 201 within a communication network using the subscriber identification module 224a, 224b (for example, a SIM card). According to an embodiment, the cellular module 221 may perform at least a portion of functions that the processor 210 provides. According to an embodiment, the cellular module 221 may include a communication processor (CP).

According to an embodiment, at least a portion (for example, two or more) of the cellular module 221, the WiFi module 223, the Bluetooth module 225, the GNSS module 227, or the NFC module 228 may be included within one integrated chip (IC) or an IC package.

The RF module 229 may transmit and receive a communication signal (for example, an RF signal). The RF module 229 may include a transceiver, a power amplifier module (PAM), a frequency filter, a low noise amplifier (LNA), an antenna, or the like. According to another embodiment, at least one of the cellular module 221, the WiFi module 223, the Bluetooth module 225, the GNSS module 227, or the NFC module 228 may transmit and receive an RF signal through a separate RF module. The subscriber identification module 224a, 224b may include, for example, a card or an embedded SIM including a subscriber identification module, and may include unique identification information (for example, an integrated circuit card identifier (ICCID)) or subscriber information (for example, integrated mobile subscriber identity (IMSI)).

The memory 230 (for example, the memory 130 of FIG. 1) may include an internal memory 232 or an external memory 234. For example, the internal memory 232 may include at least one of a volatile memory (for example, a dynamic random access memory (DRAM), a static RAM (SRAM), or a synchronous DRAM (SDRAM)), and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory 234 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 234 may be functionally or physically connected to the electronic device 201 through various interfaces.

In addition, the memory 230 may store a configuration corresponding to an account that is logged on to the electronic device 201. A plurality of accounts may be logged on to the electronic device 201, and the memory 230 may store a plurality of configurations corresponding to the plurality of accounts, respectively. The memory 230 may store UIs regarding the plurality of configurations In addition, the memory 230 may store information regarding screen configurations suitable for use in various forms of the electronic device 201. Furthermore, the memory 230 may store information regarding whether the account change mode and/or the SIM change mode is activated in the electronic device 201.

The sensor module 240 may measure, for example, a physical quantity or may detect an operation state of the electronic device 201, and may convert the measured or detected information to an electrical signal. The sensor module 240 may include at least one of, for example, a gesture sensor 240A, a gyro sensor 240B, a barometer sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illuminance sensor 240K, an UV sensor 240M, or the state detection sensor 240N. Additionally or alternatively, the sensor module 240 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. According to an embodiment, the electronic device 201 may further include a processor which is a portion of the processor 210 or a separate element from the processor 210 and is configured to control the sensor module 240. The processor 210 may control the sensor module 240 while the processor 210 remains at a sleep state.

Figure 4A:
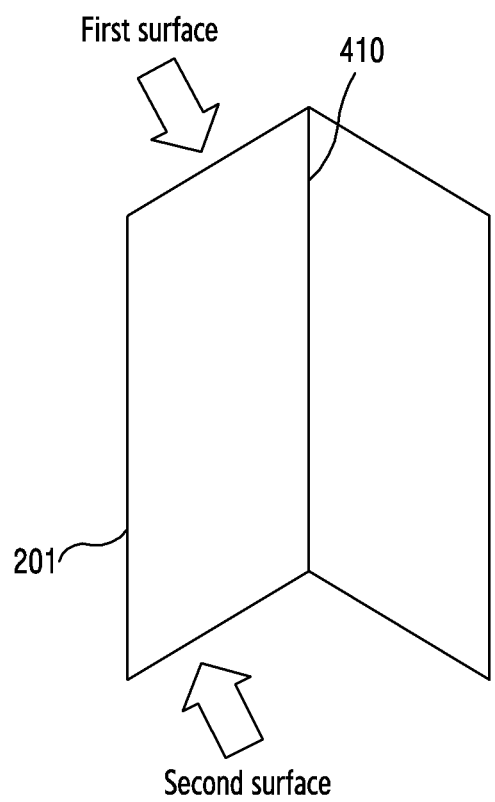
FIGS. 4A and 4B are views illustrating a method of folding and spreading the electronic device employing the flexible display according to various embodiments of the present disclosure.
Figure 4B:
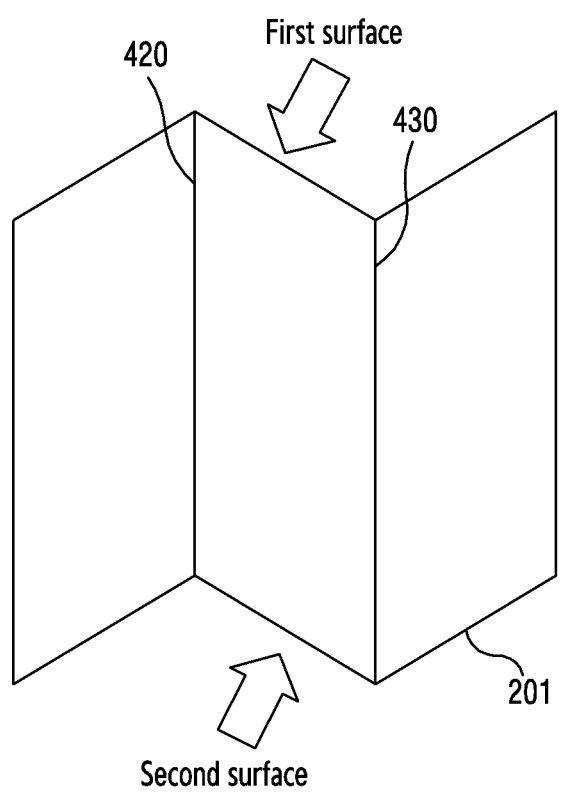

According to various embodiments, the state detection sensor 240N may detect a change of the form of the electronic device 201. For example, when the electronic device 201 includes one folding axis or a plurality of folding axes as shown in FIG. 4A or 4B, the state detection sensor 240N may be disposed on the respective folding axes or both ends of the electronic device 201 to measure a spreading angle of the electronic device 201, and the processor 210 may detect a change of the form due to a change of the spreading angle. In another example, when the electronic device 201 is implemented in the form of a rollable electronic device provided with a rollable display as shown in FIG. 7, the state detection sensor 240N may measure a spreading curvature of the spread electronic device 201, and the processor 210 may detect a change of the form due to a size of a display region spread at a curvature larger than a threshold curvature. The state detection sensor 240N may detect a folding state of a main body housing of the electronic device 201 which is folded along with the display 260, by using a hall sensor (not shown) or the magnetic sensor 240D provided in a folding structure. The state detection sensor 240N may include at least one of the proximity sensor 240G, the illuminance sensor 240K, the magnetic sensor 240D, the hall sensor (not shown), the gesture sensor 240A, a bending sensor (not shown), and the UV sensor 240M, or a combination thereof. In addition, the state detection sensor 240N may determine a folding state, and may provide a result of determining to the processor 210.

The input device 250 may include, for example, a touch panel 252, a (digital) pen sensor 254, a key 256, or an ultrasonic input device 258. The touch panel 252 may use at least one of a capacitive, resistive, infrared or ultrasonic detecting method. Also, the touch panel 252 may further include a control circuit. The touch panel 252 may further include a tactile layer to provide a tactile reaction to a user. The (digital) pen sensor 254 may be, for example, a portion of a touch panel or may include an additional sheet for recognition. The key 256 may include, for example, a physical button, an optical key, or a keypad. The ultrasonic input device 258 may detect an ultrasonic wave, which is generated from an input tool, through a microphone (for example, a microphone 288), and may identify data corresponding to the detected ultrasonic wave.

The display 260 (for example, the display 160 of FIG. 1) may include a panel 262, a hologram device 264, a projector 266, and/or a control circuit for controlling the aforementioned elements. The panel 262 may be implemented to be flexible, transparent, or wearable. The panel 262 and the touch panel 252 may be integrated into one or more modules. The hologram device 264 may display a stereoscopic image in a space using a light interference phenomenon. The projector 266 may project light onto a screen so as to display an image. The screen may be disposed inside or outside the electronic device 201.

In addition, the display 260 may display a user interface based on a configuration corresponding to an account currently logged on to the electronic device 201. The display 260 may display a pop-up for identifying an account change, a SIM change, or a mode change, and may display a pop-up for indicating a plurality of accounts registered at the electronic device 201.

The interface 270 may include an HDMI 272, a USB 274, an optical interface 576, or a D-subminiature (D-sub) 278. The interface 270 may be included, for example, in the communication interface 170 illustrated in FIG. 1. Additionally or alternatively, the interface 270 may include, for example, a mobile high definition link (MI-IL) interface, a SD card/multi-media card (MMC) interface, or an infrared data association (IrDA) standard interface.

The audio module 280 may convert a sound and an electric signal in dual directions. At least a portion of the audio module 280 may be included, for example, in the input/output interface 150 illustrated in FIG. 1. The audio module 280 may process, for example, sound information that is inputted or outputted through a speaker 282, a receiver 284, an earphone 286, or a microphone 288.

The camera module 291 may be, for example, a device for shooting a still image or a video, and according to an embodiment, the camera module 291 may include, for example, one or more image sensors (for example, a front sensor or a rear sensor), a lens, an image signal processor (ISP), or a flash (for example, an LED or a xenon lamp).

The power management module 295 may manage, for example, power of the electronic device 201. According to an embodiment, the power management module 295 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method or an electromagnetic wave method, and may further include an additional circuit for wirelessly charging, for example, a coil loop, a resonance circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a portion thereof (for example, the processor 210), such as a booting state, a message state, a state of an operation in execution (for example, a phone mode, a tablet mode), information of an account in execution, or a charging state. The motor 298 may convert an electrical signal into a mechanical vibration and may generate vibration, a haptic effect, and the like. For example, the electronic device 201 may include a mobile TV supporting device (for example, a GPU) for processing media data according to the standards of digital multimedia broadcasting (DMB), digital video broadcasting (DVB), MediaFlo™ or the like. Each of the elements described in the present disclosure may be configured with one or more components, and the names of the elements may be changed according to the type of the electronic device. According to various embodiments, some elements of the electronic device 201 may be omitted or other additional elements may be added. Furthermore, some of the elements may be combined with each other so as to form one entity, and the functions of the elements may be performed in the same manner as before being combined.

FIG. 3 is a view illustrating an electronic device employing a flexible display according to various embodiments of the present disclosure.

The electronic device 201 according to various embodiments of the present disclosure may employ a flexible display which can be folded and spread as shown in FIG. 3. For example, the electronic device 201 may employ various types of flexible displays, such as a foldable display which can be folded or unfolded at a specific angle or a specific curvature, a bendable display which can be bent or unbent at a specific curvature, or a rollable display which can be rolled in a cylindrical shape or unrolled. The types of the flexible displays described above are merely examples, and the electronic device 201 may employ various types of flexible displays. In addition, although FIG. 3 depicts that the flexible display is employed on a front surface of the electronic device 201, the flexible display may be equally employed on a rear surface of the electronic device 201.

Referring to FIG. 3, the form of the electronic device 201 may be changed by folding, bending, rolling or spreading the electronic device 201. For example, when the electronic device 201 is folded, bent, or rolled, the electronic device 201 may be in the phone form of the bar type like the form 301-1 of FIG. 3. In another example, when the electronic device 201 is spread, the electronic device 201 may be in the tablet form like the form 301-2 of FIG. 3. FIG. 3 illustrates that the form of the electronic device 201 is one of the phone form of the bar type or the tablet form, but this is merely an example, and the form of the electronic device 201 may be changed to various forms. For example, in the form 301-1 or 301-2, the electronic device 201 may be folded or bent with reference to a folding axis or a bending axis, which is a horizontal axis passing through the center of the electronic device 201, to have its upper and lower ends face each other, or may be rolled from top to bottom of the electronic device 201. Throughout the detailed description, the folding axis or the bending axis refers to a line along which the flexible display employed in the electronic device 201 is folded, for example, an axis about which the flexible display employed in the electronic device 201 is folded by means of a hinge means provided on the electronic device 201 (for example, a housing of the electronic device 201). The positions and the number of the folding axes or bending axes in the electronic device 201 are not limited, and accordingly, the electronic device 201 may be folded or bent in plural times, or asymmetrically folded or bent. In addition, according how much the electronic device 201 is folded, bent, rolled, spread, the electronic device 210 may be in an intermediate changed form rather than in a completely folded, bent, rolled, or spread form.

FIGS. 4A and 4B illustrate a method of folding and spreading the electronic device 201 employing the flexible display according to various embodiments of the present disclosure.

Although FIGS. 4A and 4B illustrate that the electronic device 201 has one folding axis 410 and two folding axes 420, 430, respectively, this is merely an example, and the number of folding axes that the electronic device 201 may have is not limited.

Referring to FIG. 4A, the electronic device 201 may have the folding axis 410 passing through the center in the vertical direction. Accordingly, the electronic device 201 may be folded, spread, or bent with reference to the folding axis 410. In the detailed description, the electronic device 201 being completely folded means that two certain portions included in one surface of the electronic device 201 face each other, such that the two portions are completely or substantially parallel to each other. In other words, the electronic device 201 being completely folded may mean that the two portions included in one surface of the electronic device 201 are not necessarily in contact with each other, but are almost close to each other. In addition, the electronic device 201 being completely spread may mean that an area of the display of the electronic device 201 exposed to the outside is the largest or approximates to the largest size. Although FIG. 4A illustrates that the folding axis 410 passes through the center of the electronic device 201, the folding axis 410 may exists on a certain position of the electronic device 201. Accordingly, the electronic device 201 may be folded or bent asymmetrically with reference to the folding axis 410, and, when the electronic device 201 is folded, two screens of the display split by the folding axis 410 and facing each other may have different sizes. In addition, according to a degree of folding of the electronic device 201, the form of the electronic device 201 may be in an intermediate state between the completely folded state and the completely spread state.

In FIG. 4A, the display of the electronic device 201 may be employed on a first surface which is a front surface of the electronic device 201, or may be employed on a second surface which is a rear surface of the electronic device 201. In addition, the display of the electronic device 201 may be employed on both the front surface and the rear surface of the electronic device 201. The electronic device 201 may activate or inactivate some regions of the display in response to the electronic device 201 being folded, bent, or spread, according to a position of the display employed on the electronic device 201. For example, when the display is employed on the second surface, which is the rear surface of the electronic device 201, and the electronic device 201 is completely folded as shown in FIG. 4A, the electronic device 201 may inactivate the display on one surface of the two surfaces forming the electronic device 201. The electronic device 201 may detect a folding state or a folding degree of the electronic device 201 as will be explained in FIGS. 5A and 5B, and may determine whether to activate or inactivate some regions of the display employed in the electronic device 201 by detecting the folding state or the folding degree. In another example, when the display is employed on the second surface, that is, the rear surface of the electronic device 201, and the electronic device 201 is completely folded as shown in FIG. 4A, the electronic device 201 may inactivate the whole display employed in the electronic device 201.

FIG. 4B illustrates the electronic device 201 including the two folding axes 420, 430.

FIG. 4B illustrates an example in which the two folding axes 420, 430 are employed in the vertical direction to split the electronic device 201 into three equal parts. Accordingly, the electronic device 201 may be folded, spread, or bent with reference to the folding axes 420, 430. For example, the electronic device 201 may be folded or bent with reference to the folding axes 420, 430 in different directions as shown in FIG. 4B. However, this is merely an example. The electronic device 201 may be folded or bent with reference to the folding axes 420, 430 in the same direction. According to positions of the two folding axes 420, 430 on the electronic device 201, the electronic device 201 may be folded or bent asymmetrically with reference to the folding axes 420, 430. Even when the electronic device 201 is completely folded with reference to the folding axes 420, 430, the respective surfaces of the electronic device split by the folding axes 420, 430 may not completely overlap one another. When the folding axes 420, 430 are employed in the electronic device 201 as shown in FIG. 4A, the display may be employed on the front surface and/or the rear surface of the electronic device 201, and the electronic device 201 may activate or inactivate the display employed in the electronic device 201 in a similar method to that of FIG. 4A.

Figure 5A:
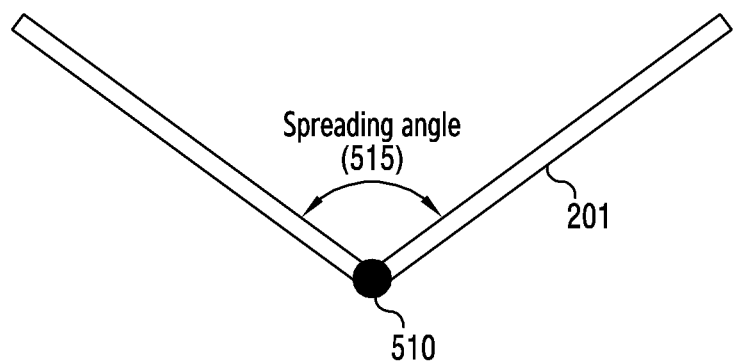
FIGS. 5A and 5B are views illustrating an operation of detecting folding and spreading of the electronic device according to various embodiments of the present disclosure.
Figure 5B:
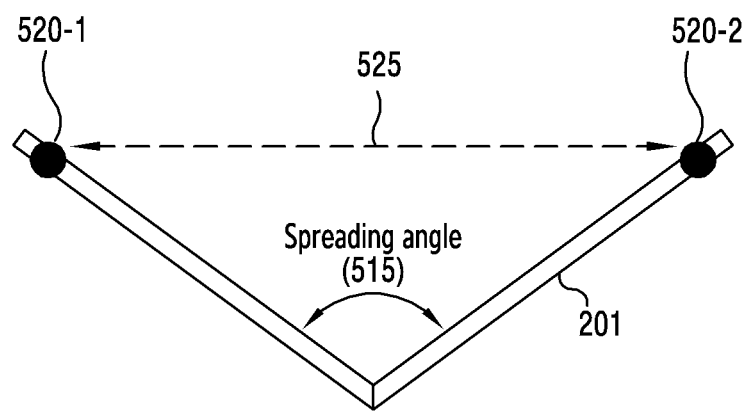

FIGS. 5A and 5B are views to illustrate an operation of detecting folding and spreading of the electronic device according to various embodiments of the present disclosure.

Referring to FIG. 5A, the sensor module 240 of the electronic device 201 may include at least one state detection sensor 510. The state detection sensor 510 may be disposed on the folding axis of the electronic device 201 to measure a spreading angle 515 of the electronic device 201. The spreading angle 510 may refer to an angle which is formed by the two surfaces of the electronic device 201 split by the folding axis with the folding axis. The electronic device 201 may measure the spreading angle 515, and may determine whether the electronic device 201 is completely folded or bent, or is completely spread. For example, when the spreading angle 515 measured by the electronic device 201 is 180 degrees or approximate thereto, the electronic device 201 may determine that the electronic device 201 is completely spread. In another example, when the spreading angle 515 measured by the electronic device 201 is 0 degree or approximate thereto, the electronic device 201 may determine that the electronic device 201 is completely folded. In addition, when the spreading angle 515 measured by the electronic device 201 falls within a pre-defined angle range, the electronic device 201 may determine that the electronic device 201 is folded, bent, or spread by a pre-defined degree. The state detection sensor 510 may include at least one of the proximity sensor 240G, the illuminance sensor 240K, the magnetic sensor 240D, the hall sensor (not shown), the gesture sensor 240A, the bending sensor (not shown), and the UB sensor 240M, or a combination thereof.

Referring to FIG. 5B, the sensor module 240 of the electronic device 201 may include at least two state detection sensors 520-1, 520-2. Unlike in the case of FIG. 5A, the state detection sensors 520-1, 520-2 of FIG. 5B may be disposed on both ends of the electronic device 201 rather than on the folding axis of the electronic device 201 to measure the spreading angle 515. For example, the state detection sensors 520-1, 520-2 may measure the spreading angle 515 of the electronic device 201 by using a distance 525 therebetween. More specifically, when the state detection sensors 520-1, 520-2 measure the distance 525 therebetween, the state detection sensors 520-1, 520-2 may measure the spreading angle 515 by using lengths of respective surfaces of the electronic device 201 split by the folding axis and the measured distance 525 because the lengths of the respective surfaces are already determined. The state detection sensors 520-1, 520-2 may be implemented by using infrared sensors, infrared cameras, etc. for measuring the distance 525.

Figure 6A:
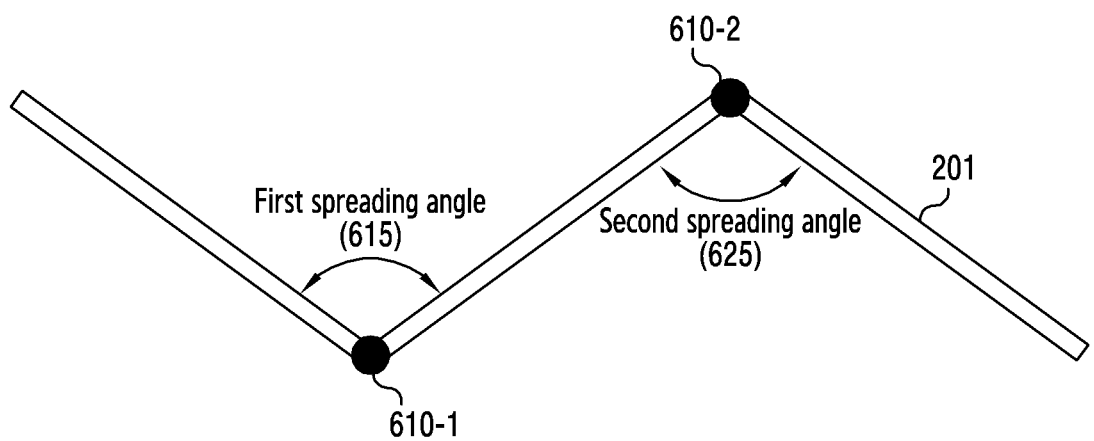
FIGS. 6A and 6B are views illustrating another operation of detecting folding and spreading of the electronic device according to various embodiments of the present disclosure.
Figure 6B:
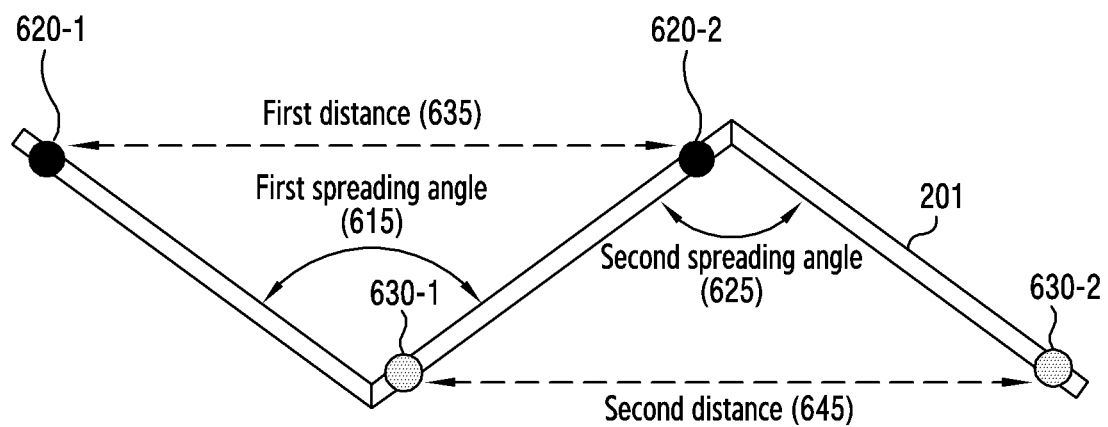

FIGS. 6A and 6B are views illustrating another operation of detecting folding and spreading of the electronic device according to various embodiments of the present disclosure.

Referring to FIG. 6A, the sensor module 240 of the electronic device 201 may include two state detection sensors 610-1, 610-2. The state detection sensors 610-1, 610-2 may be disposed on respective folding axes of the electronic device 201 to measure a first spreading angle 615 and a second spreading angle 625 of the electronic device 201. The respective state detection sensors 610-1, 610-2 may individually measure the first spreading angle 615 and the second spreading angle 625, and the electronic device 201 may determine the form of the electronic device 201 by combining the first spreading angle 615 and the second spreading angle 625. For example, when both the first spreading angle 615 and the second spreading angle 625 measured by the state detection sensors 610-1, 610-2 are 180 degrees or approximate thereto, the electronic device 201 may determine that the electronic device 201 is completely spread. In another example, when both the first spreading angle 615 and the second spreading angle 625 measured by the electronic device 201 are 0 degree or approximate thereto, the electronic device 201 may determine that the electronic device 201 is completely folded. The state detection sensors 610-1, 610-2 may include at least one of, for example, the proximity sensor 240G, the illuminance sensor 240, the magnetic sensor 240D, the hall sensor (not shown), the gesture sensor 240A, the bending sensor (not shown), and the UV sensor 240M, and a combination thereof.

Referring to FIG. 6B, the sensor module 240 of the electronic device 201 may include two pairs of state detection sensors 620-1, 620-2, 630-1, 630-2. Unlike in FIG. 6A, the two pairs of state detection sensors 620-1, 620-2, 630-1, 630-2 in FIG. 6B may be disposed on ends of respective regions of the electronic device split by respective folding axes, rather than on the respective folding axes of the electronic device 201, to measure the first spreading angle 615 and the second spreading angle 625 of the electronic device 201. For example, one pair of state detection sensors 620-1, 620-2 and the other pair of state detection sensors 630-1, 630-2 may measure the first spreading angle 615 and the second spreading angle 625, respectively, by using a first distance 635 and a second distance 645 therebetween. The two pairs of state detection sensors 620-1, 620-2, 630-1, 630-2 may be implemented by using infrared sensors for measuring distances, for example.

Figure 7A:
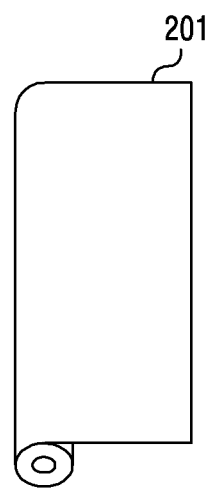
FIGS. 7A and 7B are views illustrating a roll-up method of the electronic device employing the flexible display according to various embodiments of the present disclosure.
Figure 7B:
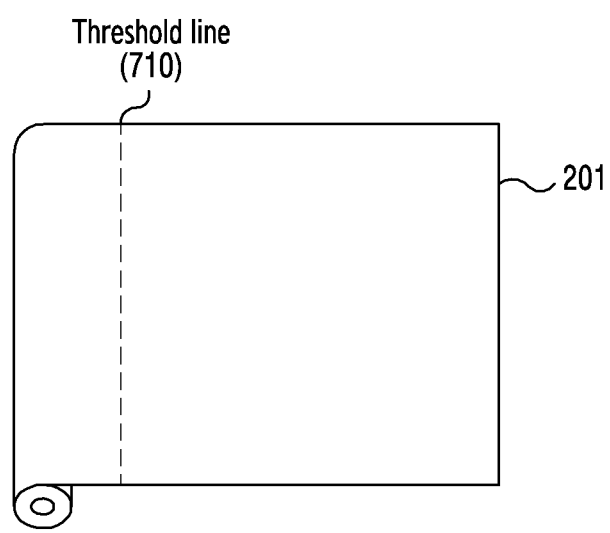

FIGS. 7A and 7B illustrate a roll-up method of the electronic device employing the flexible display according to various embodiments of the present disclosure.

As shown in FIGS. 7A and 7B, the electronic device 201 may be implemented in the form of a rollable electronic device provided with a rollable display. When the electronic device 201 is implemented in the form of the rollable electronic device, the electronic device 201 may inactivate a rolled display region except for a display region exposed to the outside. According to how much the user spreads the electronic device 201 rolled in a cylindrical shape, an area of the display of the electronic device 201 exposed to the outside may be relatively narrow as shown in FIG. 7A, or the area exposed to the outside may be relatively wide as shown in FIG. 7B. For example, when the area of the display of the electronic device 201 exposed to the outside is relatively narrow as shown in FIG. 7A in comparison to the case of FIG. 7B, the electronic device 201 may be used in the phone form of the bar type. In another example, when the area of the display of the electronic device 201 exposed to the outside is relatively wide as shown in FIG. 7B in comparison to the case of FIG. 7A, the electronic device 201 may be used in the tablet form.

In addition, the electronic device 201 may obtain information regarding a size of a region of the display of the electronic device 201 exposed to the outside, based on a degree of a spreading curvature of the spread electronic device 201. For example, the electronic device 201 may measure the spreading curvature of the spread electronic device 201, based on the state detection sensor 240N. A threshold curvature may be pre-defined to measure the degree of the spreading curvature, and accordingly, the electronic device 201 may obtain a size of a region of the display spread by a curvature larger than the threshold curvature. The electronic device 201 may determine whether the electronic device 201 is used in the phone form of the bar type as shown in FIG. 7A, or in the tablet form as shown in FIG. 7B, based on the information regarding the size.

In another example, the electronic device 201 may set a virtual threshold line 710 on the display of the electronic device 201, and may obtain the information regarding the size of the region of the display of the electronic device 201 exposed to the outside. For example, the state detection sensor 240N of the electronic device 201 may obtain information regarding a difference in curvatures between adjacent two portions positioned opposite each other with reference to the threshold line 710 on the display, and, when the curvature difference is larger than a predetermined value, it may be determined that the display is exposed to the outside as large as an area crossing the threshold line. Based on the information regarding the size, the electronic device 201 may determine whether the electronic device 201 is in the phone form of the bar type as shown in FIG. 7A, or in the tablet form as shown in FIG. 7B.

As described above, the electronic device 201 may employ the flexible display which can be folded, bent, rolled, or spread. For example, the electronic device 201 may be folded, bent, or spread based on one or more folding axes as shown in FIG. 4A or 4B, and may be rolled in the cylindrical shape or spread as shown in FIGS. 7A and 7B. According to whether the electronic device 201 is folded, bent, rolled, or spread, or according to a degree of folding, bending, rolling, or spreading, the form that one electronic device 201 may have may be diverse.

According to various forms of the electronic device 201, a function or a configuration of the electronic device 201 that is required by each form may be different. For example, the user may use the electronic device 201 in the phone form like the form 301-1 only for personal use. Accordingly, the electronic device 201 in the phone form may require a configuration or a function reflecting user's personal preference. The configuration regarding the electronic device 201 may include, for example, information regarding authority to use applications stored in the electronic device 201, information regarding arrangements and types of the applications displayed on the display of the electronic device 201 through a user interface, information regarding a screen configuration of the electronic device 201, information regarding contents provided by the applications, information regarding versions of the applications, privacy information such as contact information stored by the user. The above-described information included in the configuration regarding the electronic device 201 is merely an example, and the configuration may include a combination of some pieces of the above-described information or may further include other types of information. The user may control or change the configuration regarding the electronic device 201 in the phone form to reflect user's personal preference. For example, in the electronic device 201 in the phone form, the user may control or change the configuration not to limit authority to use the applications stored in the electronic device 201, to arrange buttons regarding the applications displayed through the UI according to user's preference, or to maintain a screen configuration as the user prefers. In addition, in the phone form, the user may control or change the configuration to determine contents provided through the applications, to set a kind of application to be executed, or to maintain a version of each application as the user prefers. Accordingly, the electronic device 201 may display a UI on the display of the electronic device 201, based on the configuration controlled or changed by the user.

When the user needs the electronic device 201 with a wide display, the user may change the form of the electronic device 201 to the electronic device 201 of the tablet form like the form 301-2, by spreading the electronic device 201 in the phone form. The user may use the electronic device 201 in the tablet form only for personal use, but the electronic device 201 in the tablet form may be used for other persons or along with other persons. For example, the user may change the form of the electronic device 201 from the phone form to the tablet form to perform a specific task or to do a presentation, and may share contents displayed on the electronic device 201 with other persons or may use the electronic device 201 with other persons. In other words, the user may use the electronic device 201 in the tablet form only for business use, and accordingly, the electronic device 201 in the tablet form may require a configuration or a function different from the configuration of the electronic device 201 in the phone form to be used for business use.

In another example, the user may change the form of the electronic device 201 from the phone form to the tablet form for the purpose of using for user's kids, and may give the electronic device 201 to the kids. For example, the user may change the form of the electronic device 210 from the phone form to the tablet form to allow kids to view a movie or a video content for an educational purpose, or to play games for the purpose of entertainment, and may give the electronic device to the kids. In other words, the user may use the electronic device in the tablet form only for kids, and accordingly, the electronic device 201 in the tablet form may require a configuration or a function different from the configuration of the electronic device 201 in the phone form to be used for kids.

As described above, the configuration or function required in the electronic device 201 is different according to whether the electronic device 201 is in the phone form or the tablet form. Accordingly, when the user changes the form of the electronic device 201 from the phone form to the tablet form, the user should change the configuration regarding the electronic device 210 to be suitable for the tablet form. For example, when the user changes the form of the electronic device 201 from the phone form to the tablet form for the purpose of performing a task, and uses the electronic device 201 with other persons, the user should change the configuration to hide a button on a specific application from the display of the electronic device 201 to protect user's personal information, to rearrange the buttons on the applications, to limitedly display phone numbers stored in the contacts, or to make a content provided through each application different. In another example, when the user changes the form of the electronic device 201 from the phone form to the tablet form for the purpose of using for kids, and gives the electronic device to the kids, the user should change the configuration to hide a button on a specific application from the display of the electronic device 201 to prevent kids' wrong operation on the applications, to rearrange the buttons on the applications, to ask the user to enter a password to access a specific application, or to change authority to use each application.

As described above, the user should change the configuration regarding the electronic device 210 to be suitable for a changed form every time the user changes the form of the electronic device 201, which may cause inconvenience. To solve this problem, embodiments of the present disclosure provide a method and an apparatus for automatically changing a configuration regarding the electronic device 201 in response to the form of the electronic device 201 being changed. To achieve this, the electronic device 201 may operate a plurality of accounts. One of the plurality of accounts may be logged on to the electronic device 201. Each of the plurality of accounts may correspond to a specific configuration. That is, the account represents the configuration of the electronic device 201. The configuration regarding the electronic device may include, for example, information regarding authority to use applications stored in the electronic device 201, information regarding arrangements and types of the applications displayed on the display of the electronic device 201 through a user interface, information regarding a screen configuration of the electronic device 201, information regarding contents provided through the applications, or information regarding versions of the applications. The above-described information included in the configuration regarding the electronic device 201 is merely an example, and the configuration may be a combination of some pieces of the above-described information, or may further include other types of information. In other words, when different accounts are used in the electronic device 201, the configurations regarding the electronic device 201 may be different as if different users use different electronic devices from the electronic device 201. However, the account is not necessarily a user specific account, and one user may own a plurality of accounts. When a plurality of accounts are operated in the electronic device 201, a configuration corresponding to each account may be pre-defined by setting or changing by the user. In addition, the configuration corresponding to each account may be a default configuration suitable for the form of the electronic device 201 that each account is logged on to.

In an embodiment, one account of two accounts, a first account and a second account, may be logged on to the electronic device 201. For example, the first account may correspond to a configuration for using the electronic device 201 in the phone form only for user's personal use. The second account may correspond to, for example, a configuration for using the electronic device 201 in the tablet form for business use or for kids. In an embodiment, it is assumed that a current form of the electronic device 201 is the phone form, and the first account is logged on to the electronic device. On this assumption, when the user changes the form of the electronic device 201 to the tablet form, the electronic device 201 may detect the change of the form of the electronic device 201, and may change the account logged on to the electronic device 201 from the first account to the second account in response to the change of the form being detected. That is, in response to the form change, the electronic device 201 may log the first account out and may log the second account on. Accordingly, the electronic device 201 may display a UI on the display 260 based on the configuration corresponding to the second account. As described above, in response to the form of the electronic device 201 being changed, the electronic device 201 may change the account regarding the electronic device 201, and may operate according to the configuration corresponding to the changed account. By doing so, user's inconvenience of having to individually change the configuration suitable for each form can be solved.

However, even when the form of the electronic device 201 is changed, the account logged on to the electronic device 201 may not be changed and should be maintained. For example, even when the user changes the form of the electronic device 201 from the phone form to the tablet form, the user may wish to maintain the configuration regarding the electronic device 201 in the phone form. Accordingly, embodiments of the present disclosure may provide a UI as shown in FIG. 8 to allow the user to determine whether to change the account of the electronic device 201 in response to the change of form of the electronic device 201.

Figure 8:
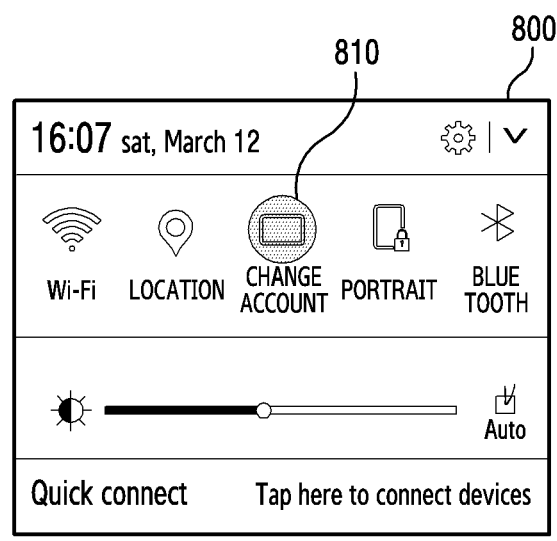
FIG. 8 is a view illustrating a user interface for displaying activation or inactivation of an account change mode according to various embodiments of the present disclosure.

FIG. 8 illustrates a user interface for displaying activation/inactivation of an account change mode according to various embodiments of the present disclosure.

A UI 800 may include a button 810 to configure activation or inactivation of the account change mode, and to display whether the account change mode is activated based on the configuration. The account change mode refers to a mode in which an account regarding the electronic device 201 is changed in response to the form of the electronic device 201 being changed. Since the account represents a configuration, the account change mode may be referred to as a configuration change mode. When the user changes the form of the electronic device 201 with the account change mode being activated, the electronic device 201 may change the account regarding the electronic device 201 in response to the change of the form of the electronic device 201 being detected. On the other hand, when the user changes the form of the electronic device 201 with the account change mode being inactivated, the electronic device 201 may not change the account regarding the electronic device 201 even in response to the change of the form of the electronic device being detected.

The button 810 may display activation or inactivation of the account change mode in the electronic device 201 in various methods. For example, the button 810 may display activation or inactivation of the account change mode by being shaded. Accordingly, when the button 810 is shaded, the button 810 may indicate that the account change mode is activated in the electronic device 201. When shading is removed from the button 810, the button 810 may indicate that the account change mode is inactivated in the electronic device 201. The above-described method for indicating activation or inactivation of the account change mode by the button 810 is merely an example, and the button 810 may display activation or inactivation of the account change mode in the electronic device 201 in other methods. For example, the button 810 may display activation or inactivation of the account change mode by changing the shape or size of the button 810.

In addition, the user may directly control activation or inactivation of the account change mode through the button 810. For example, the user may change the activation/inactivation state of the account change mode by touching a position of the button 810 displayed on the display 260 of the electronic device 201. When the user touches the position of the button 810 displayed on the display 260 with the account change mode being inactivated, the button 810 may be shaded and the account change mode may be activated. To the contrary, when the user touches the position of the button 810 displayed on the display 260 with the account change mode being activated, shading may be removed from the button 810 and the account change mode may be inactivated.

As described above, the user may identify whether the account change mode is activated, based on the button 810 displayed through the UI 800, and may control activation or inactivation of the account change mode through the button 810. Accordingly, the user may make the account regarding the electronic device 201 be changed in response to the form of the electronic device 201 being changed, and, even when the form of the electronic device 201 is changed, the user may not make the account regarding the electronic device 201 be changed.

Figure 9:
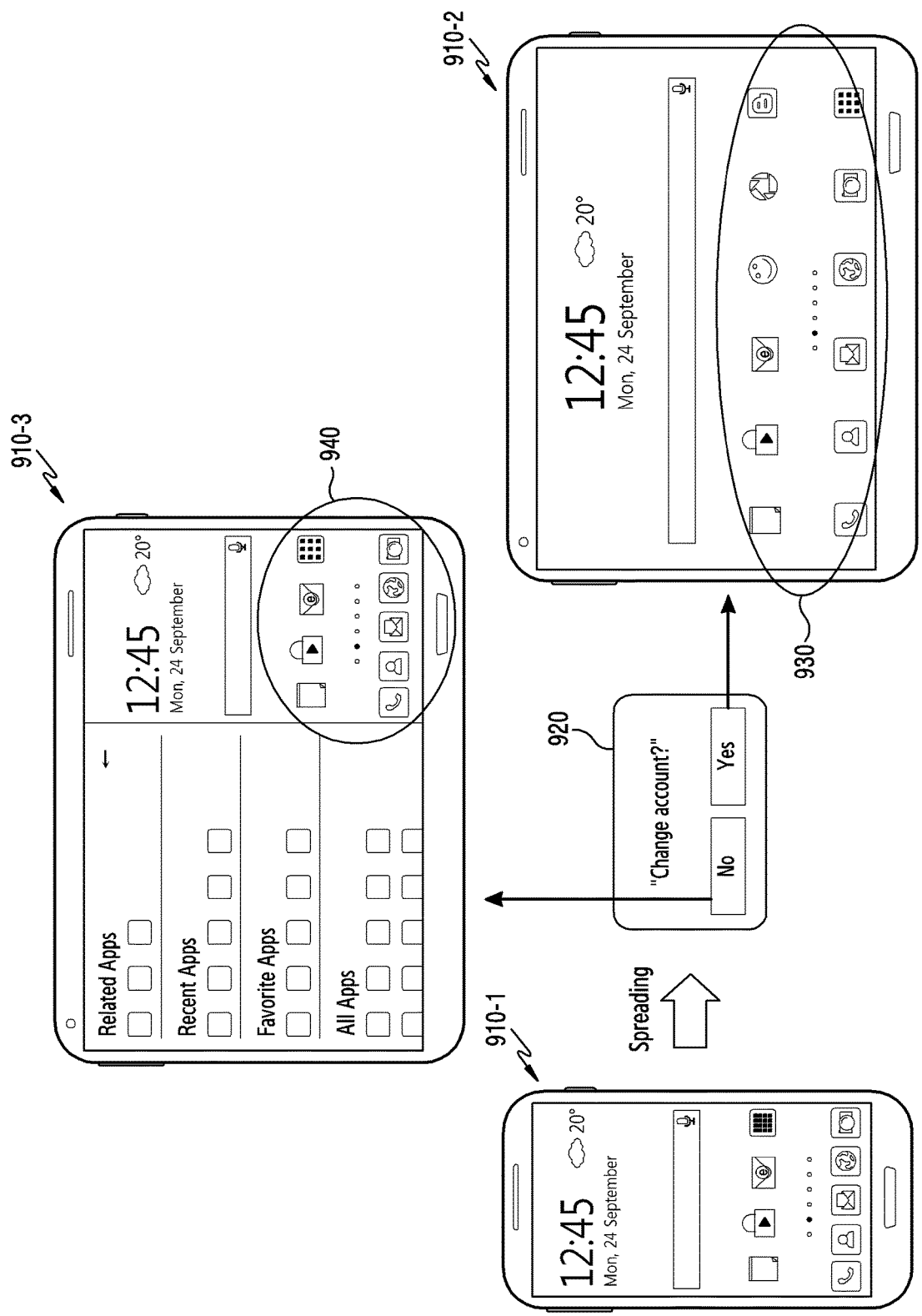
FIG. 9 is a view illustrating an operation according to spreading of the electronic device according to various embodiments of the present disclosure.

FIG. 9 is a view to illustrate an operation according to spreading of the electronic device according to various embodiments of the present disclosure.

In FIG. 9, it is assumed that the form of the electronic device 201 is changed from the phone form of the bar type to the tablet form.

A state 910-1 indicates that the first account is logged on to the electronic device 201 and the form of the electronic device 210 is the phone form. In the state 910-1, the form of the electronic device 201 may indicate that the electronic device 201 is completely folded, rolled, or bent as the flexible display is employed. For example, the electronic device 201 may include one folding axis or a plurality of folding axes as shown in FIG. 4A or 4B, and the spreading angle of the electronic device 201 formed by one folding axis or the plurality of folding axes may be 0 degree or approximate thereto. In another example, the electronic device 201 may be implemented in the form of a rollable electronic device provided with a rollable display as shown in FIG. 7A or 7B, and the state 910-1 may be a state in which an area of the display of the electronic device 201 exposed to the outside is less than or equal to a threshold area. In the state 910-1, it is assumed that the first account is logged on to the electronic device 201. The first account may correspond to, for example, a configuration only for user's personal use. The electronic device 201 may display a UI based on the configuration corresponding to the first account with the first account being logged on.

The user may change the form of the electronic device 201 to the tablet form by spreading the electronic device 201. The state detection sensor 240N of the electronic device 201 may detect the change of the form of the electronic device 201.

In response to the state detection sensor 240N detecting the change of the form of the electronic device 201, the processor 201 may change the account logged on to the electronic device 201. Accordingly, the display 260 may display a UI based on a configuration corresponding to the second account, which is different from the first account, in the tablet form. The second account may correspond to, for example, a configuration for business use or for kids. A state 910-2 indicates a state in which the second account is logged on to the electronic device 201, and the form of the electronic device 201 is the tablet form. Since the account logged on to the electronic device 201 in the state 910-2 is different from the account logged on to the electronic device 201, the display 260 may display a UI based on a configuration different from the configuration of the electronic device 201. The configurations corresponding to the first account and the second account may include, for example, information regarding authority to use the applications stored in the electronic device 201, information regarding arrangements and types of the applications displayed on the display of the electronic device 201 through a user interface, information regarding a screen configuration regarding the electronic device 201, information regarding contents provided through the applications, and information regarding versions of the applications. The above-described information included in the configuration regarding the electronic device is merely an example, and the configuration may include a combination of some pieces of the above-described information, or may further include other types of information.

According to an embodiment, when the account change mode is activated, the processor 210 may directly change the account logged on to the electronic device 201 in response to the state detection sensor 240N detecting the change of the form of the electronic device 201. According to another embodiment, in response to the state detection sensor 240N detecting the change of the form of the electronic device 201, the processor 210 may allow the user to determine whether to change the account logged on to the electronic device 201. For example, the display 260 may display a pop-up 920 including a message saying "Change account?" in response to the change of the form of the electronic device 201 being detected. The pop-up 920 may additionally include an interface for accepting the account change. For example, when the user touches the button of "Yes" displayed on the pop-up 920 through the display 260 as shown in FIG. 9, the account logged on to the electronic device 201 may be changed from the first account to the second account, and, in response to the account being changed, the display 260 may display a screen related a configuration of the changed second account. However, when the user touches the button of "No" displayed on the pop-up 920 through the display 260, the form of the electronic device 201 may be changed to the tablet form, but the account logged on to the electronic device 201 may be maintained as the first account. In response to the account being maintained, the display 260 may display a screen related to the configuration of the first account (a screen changing the UI in the phone form to an extended UI). In other words, even when the user changes the form of the electronic device 201 with the account change mode being activated in the electronic device 201, the processor 210 may not change the account logged on to the electronic device 201 according to a user's selection.

A state 910-3 indicates that the form of the electronic device 201 is the tablet form, and the account logged on to the electronic device 201 is the first account. Accordingly, the display 260 may display a UI based on the configuration corresponding to the first account in the state 910-3. Since the configuration corresponding to the first account and the configuration corresponding to the second account are different from each other, the display 260 may display different UIs based on the respective configurations. For example, the display 260 may display a first application group 930 based on the configuration corresponding to the second account in the state 910-2, and may display a second application group 940 based on the configuration corresponding to the first account in the state 910-3. For example, types of applications constituting the first application group 930 and the second application group 940 may be different, and positions of the applications displayed on the UIs may be different.

In another example, the display 260 may display a UI having a screen configuration as in the state 910-2 based on the configuration corresponding to the second account, and may display a UI having a screen configuration as in the state 910-3 based on the configuration corresponding to the first account. Referring to FIG. 9, the electronic device 201 may have a screen configuration in which applications included in the first application group 930 are widely distributed on the full tablet display without splitting the screen so as to be suitable for the display 260 for the tablet form as in the state 910-2. In addition, the electronic device 201 may have a screen configuration in which the screen is split as in the state 910-3, and the display in the phone form is maintained and information related to the second application group 940 or other information is displayed on the other screen.

The electronic device 201 may display the application groups 930, 940 based on the different configurations in the different states 910-2, 910-3, and have the different screen configurations. However, this is merely an example, and the different configurations may also vary. For example, the information regarding the authority to use the applications stored in the electronic device 201, the information regarding the arrangements and types of the applications displayed on the display of the electronic device 201 through the user interface, the information regarding the screen configuration regarding the electronic device 201, the information regarding the contents provided through the applications, or the information regarding the versions of the applications may be different in different accounts. In addition, FIG. 9 depicts that the different accounts can be logged on to the electronic device 201 in the tablet form, but this is merely an example, and different accounts may be logged on to the electronic device 201 in the phone form. Accordingly, since the second account may be logged on to the electronic device 201 in the phone form, the processor 210 may additionally perform a procedure for identifying what a currently logged on account is when the change of the form of the electronic device 201 from the phone form to the tablet form is detected.

Figure 10:
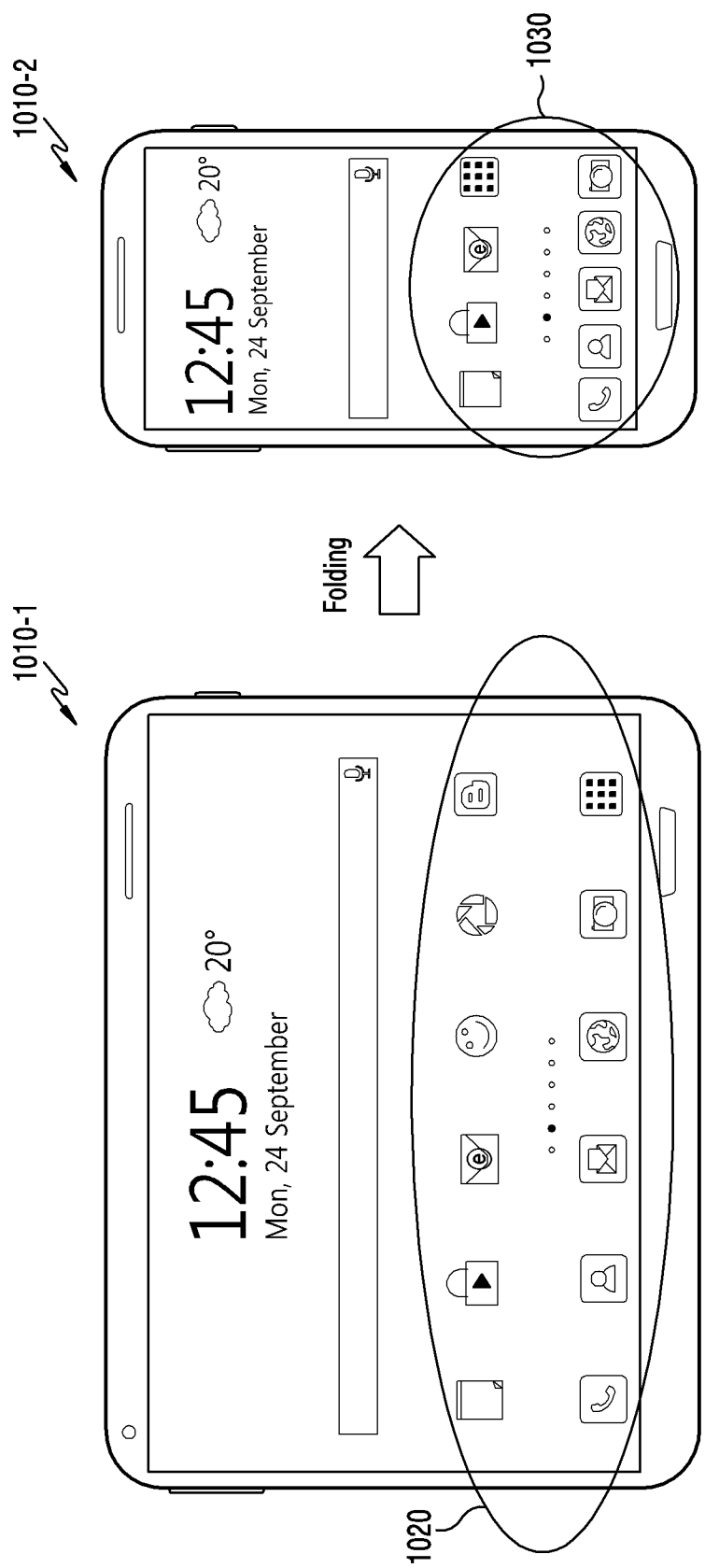
FIG. 10 is a view illustrating a process of changing an account to be used in the electronic device according to folding of the electronic device according to various embodiments of the present disclosure.

FIG. 10 illustrates a process of changing an account to be used in the electronic device according to folding of the electronic device according to various embodiments of the present disclosure.

In FIG. 10, it is assumed that the form of the electronic device 201 is changed from the tablet form to the phone form of the bar type. In addition, the electronic device 201 is not limited to being folded, and may be bent or rolled to change the form of the electronic device 201 from the tablet form to the phone form of the bar type.

A state 1010-1 is a state in which the form of the electronic device 201 is the tablet form, and the account logged on to the electronic device 201 is the second account. Accordingly, the electronic device 201 may display a UI based on a configuration corresponding to the second account in the state 1010-1. The second account may correspond to, for example, a configuration for business use or for kids. The user may change the electronic device 201 in the tablet form to the phone form by bending, folding, or rolling the electronic device 201. The state detection sensor 240N of the electronic device 201 may detect the change of the form of the electronic device 201. For example, when the electronic device 201 includes one folding axis or a plurality of folding axes as shown in FIG. 4A or 4B, the state detection sensor 240N may be disposed on the respective folding axes or on both ends of the electronic device 201 to measure a spreading angle of the electronic device, and the electronic device 201 may detect the change of the form due to a change of the spreading angle. In another example, when the electronic device 201 is implemented in the form of a rollable electronic device provided with a rollable display as shown in FIG. 7A or 7B, the state detection sensor 240N may measure a spreading curvature of the spread electronic device 201, and the electronic device 201 may detect the change of the form due to a size of a display region spread by a curvature larger than a threshold curvature.

In response to the state detection sensor 240N detecting the change of the form of the electronic device 201, the processor 210 may change the account logged on to the electronic device 201 from the second account to the first account. The first account may correspond to, for example, a configuration only for user's personal use. In this case, in response to the change of the form of the electronic device 201 being detected, the processor 210 may change the account logged on to the electronic device 201, regardless of whether the account change mode is activated. In other words, when the user changes the electronic device 201 in the tablet form to the phone form, the user may intend to use the electronic device 201 of the changed form (phone form) only for personal use, unlike in the case where the user changes the electronic device 201 in the phone form to the tablet form. Accordingly, in an embodiment, the processor 210 may change the account logged on to the electronic device 201 from the second account to the first account, regardless of whether the account change mode is activated, such that user's need can be satisfied. Accordingly, when the user changes the electronic device 201 in the tablet form to the phone form, the user may change the account logged on to the electronic device 201 to an account as the user desires (the first account), simply by changing the form of the electronic device 201, without having to identify whether the account change mode is activated or having to select the account change.

As described above, according to an embodiment, when the form of the electronic device 201 is changed from the tablet form to the phone form, the processor 210 may change the account logged on to the electronic device 201 regardless of whether the account change mode is activated. According to another embodiment, although the form of the electronic device 201 is changed from the tablet form to the phone form, the processor 210 may change the account logged on to the electronic device 201 only when the account change mode is activated, and may control the display 260 to display a pop-up to allow the user to determine whether to change the account. In addition, since the first account may be logged on to the electronic device 201 in the tablet form, the processor 210 may additionally perform a procedure for identifying what a currently logged on account is, when the change of the form of the electronic device 201 from the tablet form to the phone form is detected. In other words, when the processor 210 identifies that the first account is already logged on in the tablet form, the processor 210 may not change the account logged on to the electronic device 201 although the change to the phone form is detected. In another method, the first account may be set as a default account regarding the phone form of the electronic device 201. Accordingly, when the state detection sensor 240N detects the change from the tablet form to the phone form, the processor 210 may always determine the default account as an account to be used in the changed form, and, only when a current account is different from the default account, the electronic device 201 may change the account logged on to the electronic device 201. Furthermore, prior to changing the account logged on to the electronic device 201 in response to the change of the form of the electronic device 201 being detected, the processor 210 may additionally perform a procedure for receiving an input of a password or a secret key to identify whether the user has authority to use the account to be changed.

A state 1010-2 is a state in which the form of the electronic device 201 is the phone form, and the account logged on to the electronic device 201 is the first account. The display 260 may display a UI based on a configuration corresponding to the second account in the state 1010-1, and may display a UI based on a configuration corresponding to the first account in the state 1010-2. Since the configuration corresponding to the first account and the configuration corresponding to the second account are different from each other, the display 260 may display different UIs based on the respective configurations. For example, the display 260 may display a first application group 1020 based on the configuration corresponding to the second account in the state 1010-1, and may display a second application group 1030 based on the configuration corresponding to the first account in the state 1010-2. For example, types of applications constituting the first application group 1020 and the second application group 1030 may be different, or positions of the applications on the UIs may be different.

Figure 11:
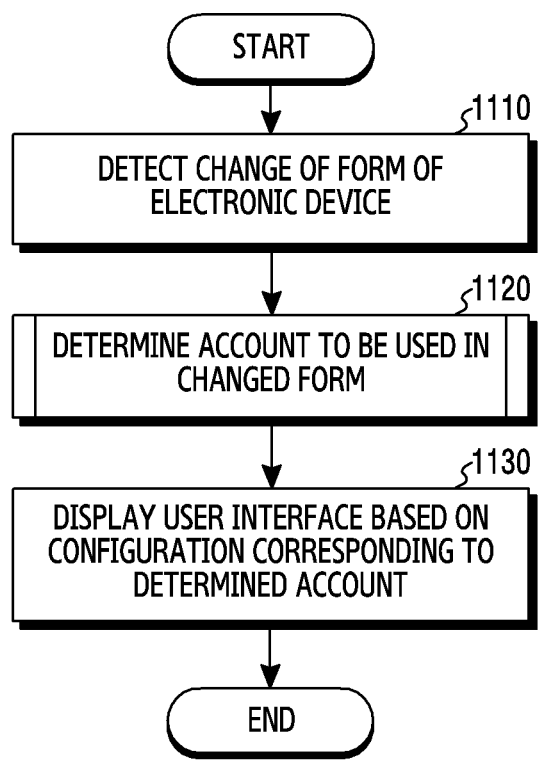
FIG. 11 is a flowchart illustrating an operation according to a change of a form of the electronic device according to various embodiments of the present disclosure.

FIG. 11 is a flowchart illustrating an operation according to a change of a form of the electronic device according to various embodiments of the present disclosure.

The processor 210 may control the state detection sensor 240N to detect a change of a form of the electronic device (step 1110). For example, when the electronic device 201 includes one folding axis or a plurality of folding axes as shown in FIG. 4A or 4B, the state detection sensor 240N of the electronic device 201 may be disposed on the respective folding axes or on both ends of the electronic device 201 to measure a spreading angle of the electronic device 201. The processor 210 may detect a change of the form caused by a change of the spreading angle. In another example, when the electronic device 201 is implemented in the form of a rollable electronic device provided with a rollable display as shown in FIG. 7A or 7B, the state detection sensor 240N may measure a spreading curvature of the spread electronic device 201, and the processor 210 may detect a change of the form due to a size of a display region spread by a curvature larger than a threshold curvature.

The processor 210 may determine an account to be used in the electronic device 201 in the changed form (step 1120). For example, in response to the change of the form of the electronic device 201 being detected, the processor 210 may change an account logged on to the electronic device 201, and accordingly, may determine an account different from the previous account as an account to be used in the changed form. In another example, in response to the change of the form of the electronic device 201 being detected, the processor 210 may not change the account logged on to the electronic device 201, and accordingly, may determine the same account as the previous account as the account to be used in the changed form. To determine whether to change the account, the processor 210 may additionally perform a procedure for controlling the display 260 to display a pop-up and to allow the user to identify whether to change the account.

The processor 210 may display a user interface based on a configuration corresponding to the determined account (step 1130). Different accounts may correspond to different configurations. A configuration corresponding to each account may include, for example, information regarding authority to use applications stored in the electronic device 201, information regarding arrangements and types of the applications displayed on the display of the electronic device 201 through the user interface, information regarding a screen configuration regarding the electronic device 201, information regarding contents provided through the applications, or information regarding versions of the applications. The above-described information included in the configuration regarding the electronic device 201 is merely an example, and the configuration may be a combination of some pieces of the above-described information, or may further include other types of information.

Figure 12:
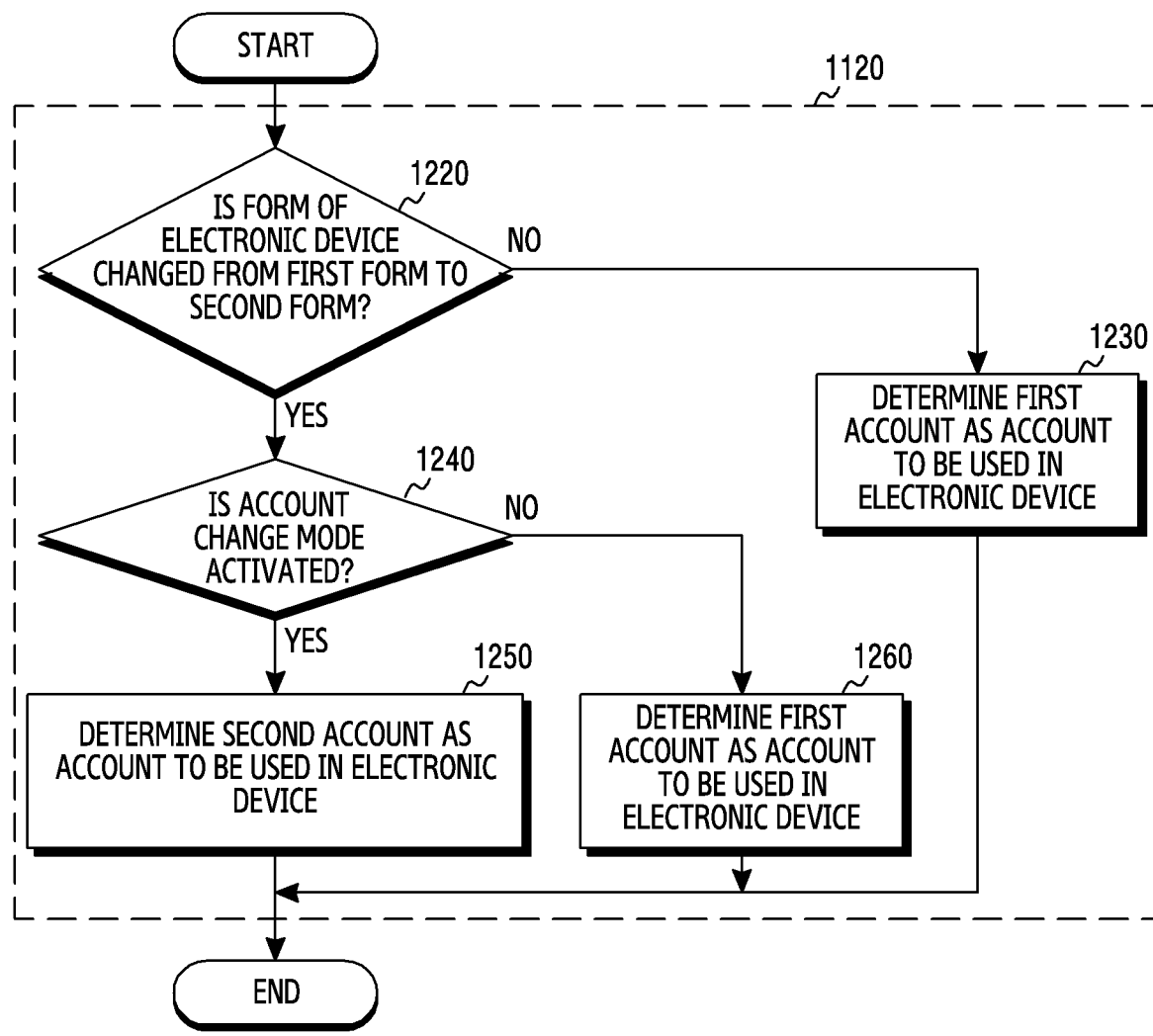
FIG. 12 is a flowchart for determining an account to be used in the electronic device according to various embodiments of the present disclosure.

FIG. 12 is a flowchart for determining an account to be used in the electronic device 201 according to various embodiments of the present disclosure. In the present flowchart, it is assumed that the processor 210 already detects a change of a form of the electronic device 201.

The processor 210 may determine whether the form of the electronic device 201 is changed from a first form to a second form (step 1220). For example, the first form may be the phone form of the bar type like the form 301-1 of FIG. 3, and the second form may be the tablet form like the form 301-2 of FIG. 3.

When the form of the processor 210 is changed from the first form to the second form, the processor 210 may determine whether an account change mode is activated (step 1240). The account change mode refers to a mode in which the account regarding the electronic device 201 is changed in response to the form of the electronic device 201 being changed. When the user changes the form of the electronic device 201 with the account change mode being activated, the processor 210 may change the account regarding the electronic device 201 in response to the change of the form being detected. Alternatively, when the user changes the form of the electronic device 201 with the account change mode being inactivated, the processor 210 may not change the account regarding the electronic device 201 although the change of the form is detected.

When the account change mode is activated, the processor 210 may change the account logged on to the electronic device 201, and may determine an account (second account) different from the account (first account) which is logged on to the electronic device 201 of the first form, as an account to be used in the second form of the electronic device 201 (step 1250). Accordingly, the processor 210 may control the display 260 to display a user interface based on a configuration corresponding to the second account. For example, the first account may be an account suitable for use in the electronic device 201 of the form phone, and may correspond to a configuration only for user's personal use. In addition, the second account may be an account suitable for use in the electronic device 201 of the tablet form, and may correspond to a configuration for business use or for kids.

When the account change mode is not activated, the processor 210 may not change the account logged on to the electronic device 201, and may determine the same account (the first account) as the account (the first account) logged on to the electronic device 201 of the first form, as the account to be used in the second form (step 1260). Accordingly, the processor 210 may control the display 260 to display a user interface based on a configuration corresponding to the first account.

Alternatively, even when the account change mode is activated, the processor 210 may not change the account logged on to the electronic device 201, and may determine the first account as the account to be used in the second form. To achieve this, the processor 210 may control the display 260 to display a pop-up, and to allow the user to determine whether to change the account although the account change mode is activated. For example, when the electronic device 201 receives, from the user through the pop-up, an input indicating that the user will not change the account of the electronic device 201, the processor 210 may determine the first account as the account to be used in the second form. In another example, when the electronic device 201 receives, from the user through the pop-up, an input indicating that the user will change the account of the electronic device 201, the processor 210 may determine the second account as the account to be used in the second form.

When the form of the electronic device 201 is not changed from the first form to the second form, in other words, when the form of the electronic device 201 is changed from the second form to the first form, the processor 210 may change the account logged on to the electronic device 201, and may determine an account (the first account) different from the account (the second account) which is logged on to the electronic device 201 of the second form, as an account to be used in the first form (step 1230). Accordingly, the processor 210 may control the display 260 to display a user interface based on a configuration corresponding to the first account. In this case, the processor 210 may change the account logged on to the electronic device 201 regardless of whether the account change mode is activated. In other words, when the user changes the electronic device 201 of the second form (tablet form) to the first form (phone form), the user may intend to use the electronic device 201 in the first form only for personal use. Therefore, the processor 210 may change the account logged on to the electronic device 201 from the second account to the first account, regardless of whether the account change mode is activated, such that user's need can be satisfied. However, although the form of the electronic device 201 is changed from the second form to the first form, the processor 210 may change the account logged on to the electronic device 201 only when the account change mode is activated, and may control the display 260 to display a pop-up and to allow the user whether to change the account.

Figure 13:
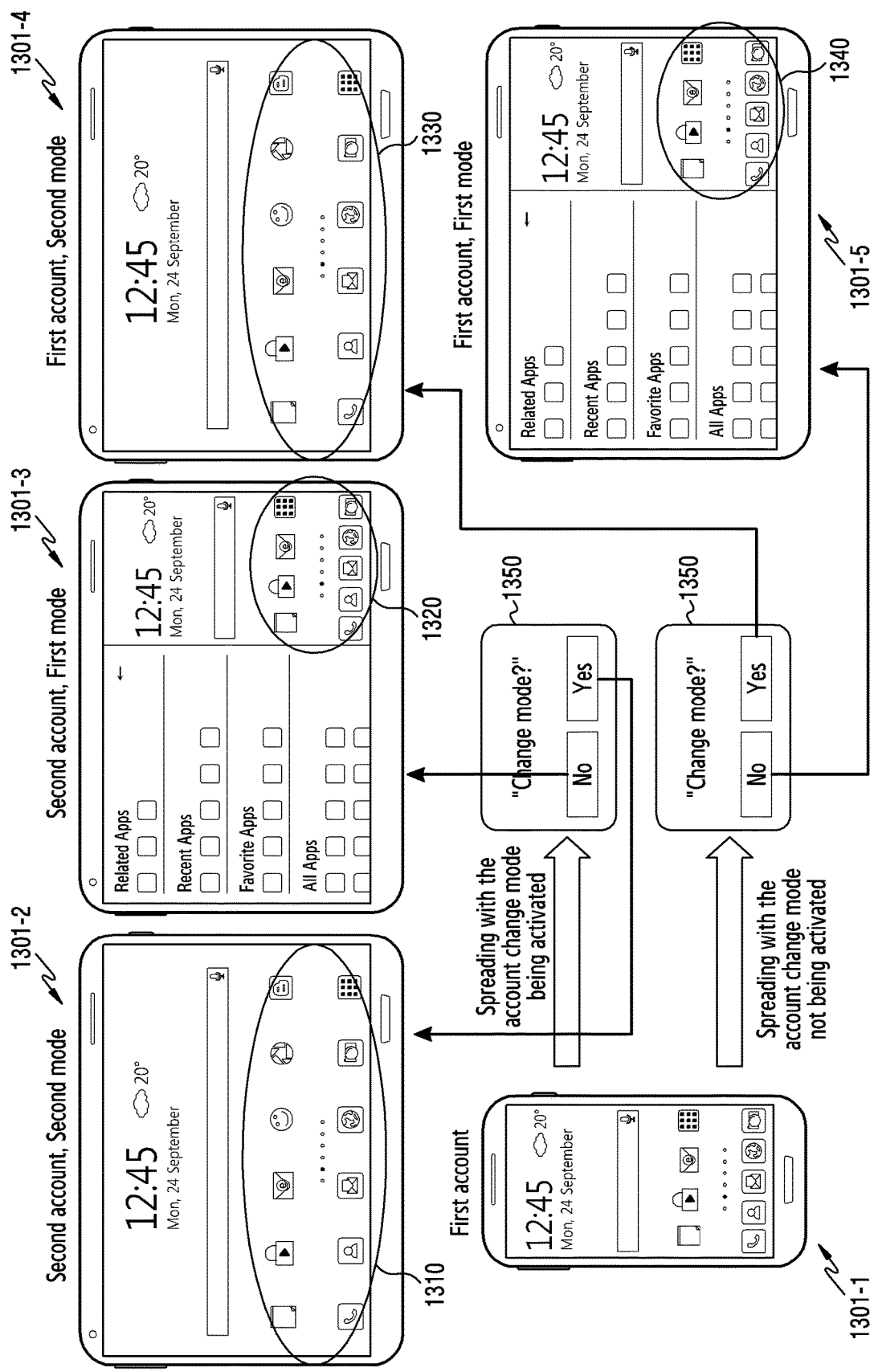
FIG. 13 is a view illustrating a process of changing a mode regarding the electronic device, separately from a change of an account to be used in the electronic device according to various embodiments of the present disclosure.

FIG. 13 illustrates a process of changing a mode regarding the electronic device, separately from change of an account to be used in the electronic device according to various embodiments of the present disclosure.

A state 1301-1 is a state in which the form of the electronic device 201 is the phone form of the bar type, and the account logged on to the electronic device 201 is the first account. In other words, the state 1301-1 may be a state in which the electronic device 201 is completely folded, completely rolled, or completely bent as a flexible display is employed. The user may change the form of the electronic device 201 to the tablet form by spreading the electronic device 201. The state detection sensor 240N of the electronic device 201 may detect such a change of the form of the electronic device 201, and, when the account change mode is activated, the electronic device 201 may change the account logged on to the electronic device 201 in response to the change of the form being detected. A state 1301-2 is a state in which the form of the electronic device 201 is the tablet form, and the account logged on to the electronic device 201 is the second account. As described above, the user may change the form of the electronic device 201 to the tablet form by spreading the electronic device 201, and the processor 210 may change the account logged on to the electronic device 201 to the second account.

The display 260 may display a UI based on a configuration corresponding to the second account in the state 1301-2. For example, the electronic device 201 may display a UI having a screen configuration as in the state 1301-2, based on the configuration corresponding to the second account. Referring to FIG. 13, the electronic device 201 in the state 1301-2 has a screen configuration (second mode) in which applications included in a first application group 1310 are widely distributed on the full tablet display without splitting the screen so as to be suitable for the display for the tablet form. However, even when the electronic device 201 displays the UI based on the configuration corresponding to the second account, the user may prefer a UI having a screen configuration as in a state 1301-3. In the state 1301-3, the electronic device 201 may have a screen configuration (first mode) in which the screen is split, and the display in the phone form is maintained, while information related to a second application group 1320 or other information is displayed on the other screen. The screen configuration regarding the electronic device 201 is directly contacted by the user through the UI, and is related to information directly displayed through the display. Therefore, the screen configuration should be treated differently from other information constituting a configuration. Accordingly, the present disclosure provides a method for changing the mode regarding the electronic device 201, separately from changing of the account regarding the electronic device 201. The mode may include information regarding a screen configuration to be displayed in a certain form of the electronic device 201 as described above.

When the user spreads the electronic device 201 with the account change mode being activated, the form of the electronic device 201 may be changed to the tablet form, and the account logged on to the electronic device 201 may be changed from the first account to the second account. In this case, the display 260 may display a pop-up 1350 including a message saying "Change mode?" to allow the user to select the first mode or the second mode. The pop-up 1350 may additionally include an interface for accepting the mode change. For example, when the user touches the button of "Yes" displayed on the pop-up 1350 through the display as shown in FIG. 13, the processor 210 may change the mode regarding the electronic device 201 to the second mode (state 1301-2). However, when the user touches the button of "No" displayed on the pop-up 1350 through the display, the electronic device may maintain the first mode without changing the mode regarding the electronic device 201 (state 1301-3). In the present disclosure, the first mode is a mode in which the display in the phone form is maintained as it is. Therefore, the mode regarding the electronic device 201 being operated as the first mode when the form of the electronic device 201 is changed from the phone form to the tablet form indicates that the mode is maintained. However, this is merely an example, and, even when the form of the electronic device 201 is changed from the tablet form to the phone form, the mode regarding the electronic device may be maintained.

When the user spreads the electronic device 201 with the account change mode not being activated, the form of the electronic device 201 may be changed to the tablet form, and the account logged on to the electronic device 201 may be maintained as the first account. Even in this case, the display 260 may display the pop-up 1350 including the message saying "Change mode?" to allow the user to select the first mode or the second mode. When the user touches the button of "Yes" displayed on the pop-up 1350 through the display, the electronic device 201 may change the mode regarding the electronic device 201 to the second mode (state 1301-4). However, when the user touches the button of "No" displayed on the pop-up 1350 through the display, the processor 210 may not change the mode regarding the electronic device 201, and may maintain the first mode (state 1301-5).

According to embodiments described in FIG. 13, even when the account regarding the electronic device 201 is changed, the mode regarding the electronic device 201 may be changed or may not be changed. In other words, the account change and the mode change in the electronic device 201 may be independently performed. For example, comparing the state 1301-2 and the state 1301-4, the mode regarding the electronic device 201 is the same as the second mode, but the accounts logged on to the electronic device 201 are the second account and the first account, which are different from each other. Accordingly, the display 260 may display the first application group 1310 based on the configuration corresponding to the second account in the second mode as in the state 1301-2, and the display 260 may display a third application group 1330 based on the configuration corresponding to the first account in the second mode as in the state 1301-4. In another example, the display 260 may display the second application group 1320 based on the configuration corresponding to the second account in the first mode as in the state 1301-3, and the display 260 may display a fourth application group 1340 based on the configuration corresponding to the first account in the first mode as in the state 1301-5. For example, types of applications constituting the respective application groups may be different, or positions of the applications on the UIs may be different.

Figure 14:
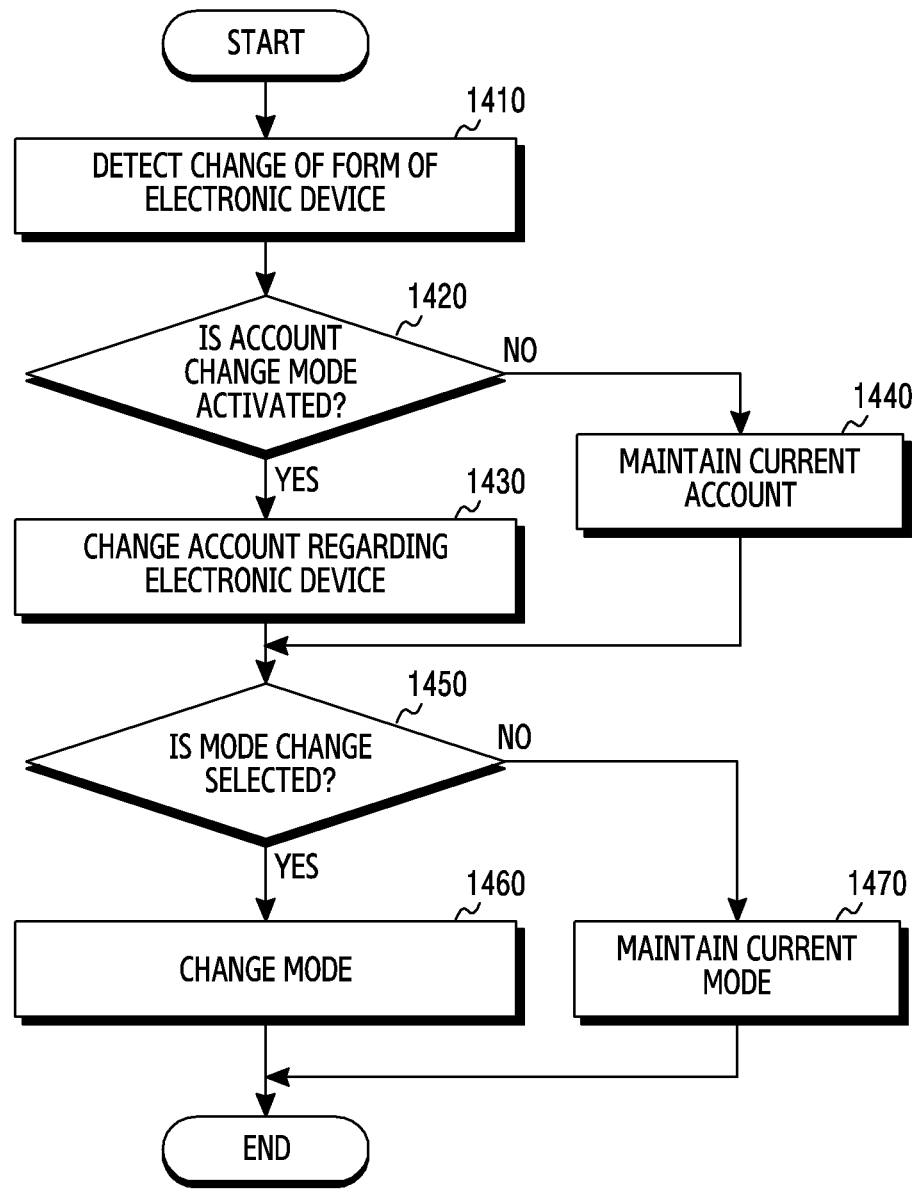
FIG. 14 is a flowchart for changing a mode regarding the electronic device, separately from a change of an account to be used in the electronic device according to various embodiments of the present disclosure.

FIG. 14 is a flowchart for changing a mode regarding the electronic device, separately from change of an account to be used in the electronic device according to various embodiments of the present disclosure.

The processor 210 may detect a change of a form of the electronic device (step 1410). For example, when the electronic device 201 includes one folding axis or a plurality of folding axes as shown in FIG. 4A or 4B, the processor 201 may control the state detection sensor 240N, disposed on the respective folding axes or on both ends of the electronic device 201, to measure a spreading angle of the electronic device. The processor 210 may detect a change of the form caused by a change of the spreading angle. In another example, when the electronic device 201 is implemented in the form of a rollable electronic device provided with a rollable display as shown in FIG. 7, the processor 210 may control the state detection sensor 240N to measure a spreading curvature of the spread electronic device 201, and the processor 210 may detect a change of the form due to a size of a display region spread by a curvature larger than a threshold curvature.

The processor 210 may determine whether an account change mode is activated (step 1420). The account change mode refers to a mode in which an account regarding the electronic device 201 is changed in response to the form of the electronic device 201 being changed.

When the account change mode is activated, the processor 210 may change the account regarding the electronic device 201 in response to the change of the form being detected (step 1430). On the other hand, when the account change mode is not activated, the processor 210 may not change the account regarding the electronic device 201 in response to the change of the form being detected (step 1440). Even when the account change mode is activated, the processor 210 may control the display 260 to display a pop-up and to allow the user to determine whether to change the account, and may not change the account regarding the electronic device 201 based on an input received from the user through the pop-up.

The processor 210 may determine whether a mode change is selected (step 1450). The mode may include information regarding a screen configuration for displaying on a certain form of the electronic device 201. For example, the processor 210 may control the display 260 to display a pop-up and to allow the user to determine whether to change the mode, and the electronic device 201 may determine whether the mode change is selected, based on an input received from the user through the pop-up.

When the mode change is selected, the processor 210 may change the mode regarding the electronic device 201 (step 1460). However, when the mode change is not selected, the processor 210 may not change the mode regarding the electronic device 201, and may maintain the mode regarding the electronic device 201 as a current mode (step 1470).

As described above, the change of the account regarding the electronic device 201 and the change of the mode regarding the electronic device 201 may be independently performed. In other words, when the account regarding the electronic device is changed from the first account to the second account in step 1310, and the mode regarding the electronic device is changed from the first mode to the second mode in step 1460, the processor 210 may display a UI based on a configuration corresponding to the second account in the second mode. A combination of the account and the mode may include all possible combinations unlike in the above-described example.

Figure 15:
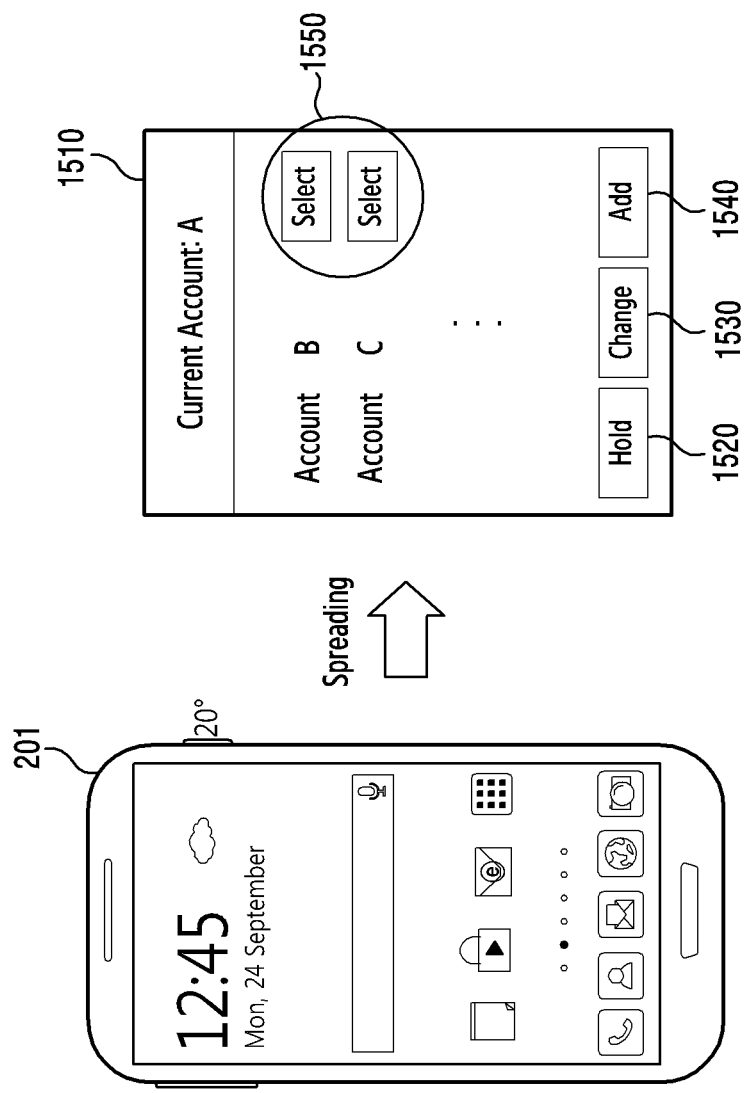
FIG. 15 is a process of selecting an account to be used from a plurality of accounts according to a change of a form of the electronic device according to various embodiments of the present disclosure.

FIG. 15 illustrates a process of selecting an account to be used from a plurality of accounts according to a form change of the electronic device according to various embodiments. In FIG. 15, it is assumed that the account change mode is activated in the electronic device 201.

The electronic device 201 may be changed to various forms according to employment of the flexible display. For example, the electronic device 201 may be folded, rolled, bent, or spread. Accordingly, the form of the electronic device 201 may be the phone form of the bar type as shown in FIG. 15, or may be the tablet form or an intermediate state therebetween.

The electronic device 201 may operate a plurality of accounts. Each of the plurality of accounts may correspond to a specific configuration. One of the plurality of accounts may be logged on to the electronic device 201, and the electronic device 201 may display a UI based on a configuration corresponding to the logged-on account. The user may determine a configuration corresponding to each of the plurality of accounts by setting or changing. For example, the user may set a configuration corresponding to a first account from among the plurality of accounts to a configuration suitable for user's personal use in the phone form. In addition, the user may set a configuration corresponding to a second account to a configuration suitable for use for a business purpose or for kids in the tablet form. The accounts operated in the electronic device 201 are not limited the first account and the second account described above, and the plurality of accounts may further include other accounts. In other words, the user may also set configurations corresponding to the other accounts to configurations suitable for special purposes, in addition to the configuration corresponding to the first account or the second account. For example, the user may set a configuration to be suitable for the purpose of playing a game, and may match the configuration to a third account.

As shown in FIG. 15, the user may change the form of the electronic device 201 to the tablet form by spreading the electronic device 201 of the phone form. However, this is merely an example, and the initial form of the electronic device 201 may be diverse. In addition, the user may change the form of the electronic device into various forms (for example, a folded, bent, or rolled form) in addition to the spread form. The processor 210 may change the account logged on to the electronic device 201 in response to the state detection sensor 240N detecting the change of the form. In this case, the processor 210 may control the display 260 to display a pop-up 1510 and to allow the user to determine whether to change the account regarding the electronic device 201. However, unlike the pop-up 910 of FIG. 9 to simply determine whether to change the account, the pop-up 1510 of FIG. 15 may allow the user to select one of the plurality of accounts different from the currently logged-on account, and to change the account to the selected account, in addition to maintaining the currently logged-on account. In other words, the pop-up 1510 may provide a UI as shown in FIG. 15. The pop-up 1510 may indicate what the currently logged-on account (A) is. In addition, the pop-up 1510 may display accounts (B, C, etc.) that the currently logged-on account may be changed to. Configurations corresponding to the accounts A, B, and C, respectively, may be set by the user according to a purpose or user's preference. The pop-up 1510 may display buttons 1550 corresponding to the respective accounts to allow the user to select an account that the user will change the currently logged-on account A to. The pop-up 1510 may display a button 1520 to maintain the currently logged-on account, and a button 1530 to change the account to the selected account. For example, when the account currently logged on to the electronic device 201 is the account A, and the user touches the button 1550 corresponding to the account B and then touches the button 1530 to change the account, the account logged on to the electronic device 201 may be changed from the account A to the account B. In addition, when the user touches the button 1520 to maintain the account, the account logged on to the electronic device 201 may not be changed and the account A may be maintained.

Alternatively, two or more accounts of the plurality of accounts operated in the electronic device 201 may be logged on to the electronic device 201 simultaneously. In other words, the electronic device 201 may include two or more central processing units (CPUs), and the respective CPUs may perform process with respect to the respective accounts. In this case, the processor 210 may log an additional account on to the electronic device 201, in addition to the currently logged-on account, in response to the state detection sensor 240N detecting the change of the form. The processor 210 may control the display 260 to display the pop-up 1510 and to allow the user to determine whether to add an account to be logged on. To achieve this, the pop-up 1510 may display a button 1540 to add an account as shown in FIG. 15. For example, when the account currently logged on to the electronic device 201 is the account A, and the user touches the button 1550 corresponding to the account B and then touches the button 1540 to add an account, the account logged on to the electronic device 201 may be not only the account A but also the account B. When both the account A and the account B are logged on to the electronic device 201, the electronic device 201 may split the display into two regions, and may display a UI corresponding to the account A on one region, and may display a UI corresponding to the account B on the other region.

Figure 16:
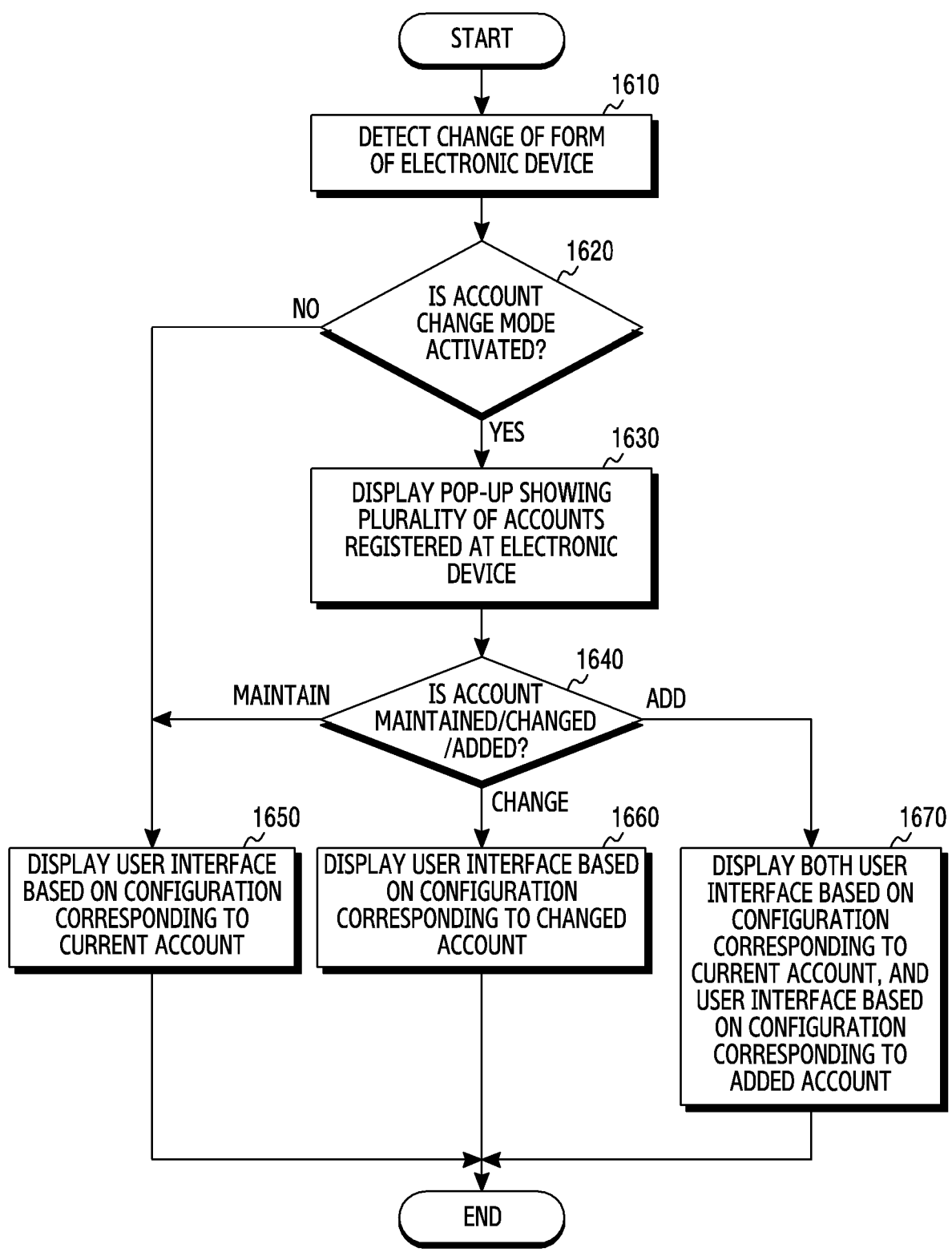
FIG. 16 is a flowchart for selecting an account to be used from a plurality of accounts according to a change of a form of the electronic device according to various embodiments of the present disclosure.

FIG. 16 is a flowchart for selecting an account to be used from a plurality of accounts according to a form change of the electronic device according to various embodiments of the present disclosure.

The processor 210 controls the state detection sensor 240N to detect a change of a form of the electronic device (step 1610). For example, when the electronic device 201 includes one folding axis or a plurality of folding axes as shown in FIG. 4A or 4B, the state detection sensor 240N of the electronic device 201 may be disposed on the respective folding axes or on both ends of the electronic device 201 to measure a spreading angle of the electronic device. The processor 210N may detect a change of the form caused by a change of the spreading angle. In another example, when the electronic device 201 is implemented in the form of a rollable electronic device provided with a rollable display as shown in FIG. 7A or 7B, the state detection sensor 240N may measure a spreading curvature of the spread electronic device 201, and the processor 210 may detect a change of the form due to a size of a display region spread by a curvature larger than a threshold curvature.

The processor 210 may determine whether an account change mode is activated (step 1620). The account change mode refers to a mode for changing an account logged on to the electronic device 201 or for adding an account in response to the change of the form of the electronic device 201.

When the account change mode is activated, the processor 210 may control the display 260 to display a pop-up to show a plurality of accounts registered at the electronic device 201 (step 1630). The pop-up may display information for allowing the user to determine whether to maintain the account logged on to the electronic device 201 without changing, to changing the account to another account, or to log an additional account on in addition to the currently logged-on account.

The processor 210 may determine whether an input instructing to maintain the currently logged-on account is received from the user through the pop-up, an input instructing to change the account is received, or an input instructing to add an account is received (step 1640). For example, the user may select at least one account from the plurality of accounts displayed through the pop-up, and the electronic device 201 may receive, from the user, an input instructing to change the logged-on account to the selected account, or an input instructing to add an account. In addition, the electronic device 201 may receive an input instructing to maintain the current account from the user through the pop-up.

When the electronic device 201 receives the input instructing to maintain the currently logged-on account from the user through the pop-up, the processor 210 may control the display 260 to display a UI based on a configuration corresponding to the current account (step 1650). In addition, even when the account change mode is not activated, the processor 210 may control the display 260 to display the UI based on the configuration corresponding to the currently logged-on account in response to the change of the form being detected (step 1650).

When the electronic device 201 receives the input instructing to change the currently logged-on account to the account selected from the plurality of accounts from the user through the pop-up, the processor 210 may change the account logged on to the electronic device 201 to the selected account, and the display 260 may display a UI based on a configuration corresponding to the changed account (step 1660).

When the electronic device 201 receives the input instructing to add the selected account in addition to the currently logged-on account from the user through the pop-up, the processor 210 may add the selected account in addition to the account logged on to the electronic device 201, and the display 260 may display UIs based on configurations corresponding to the current account and the added account, respectively (step 1670). Specifically, the electron device 201 may include two or more CPUs, and the respective CPUs may perform process with respect to the plurality of logged-on accounts. For example, when both the account A and the account B are logged on to the electronic device 201, the electronic device 201 may split the display into two parts, and may display the UI corresponding to the account A on one display and may display the UI corresponding to the account B on the other display.

Figure 17:
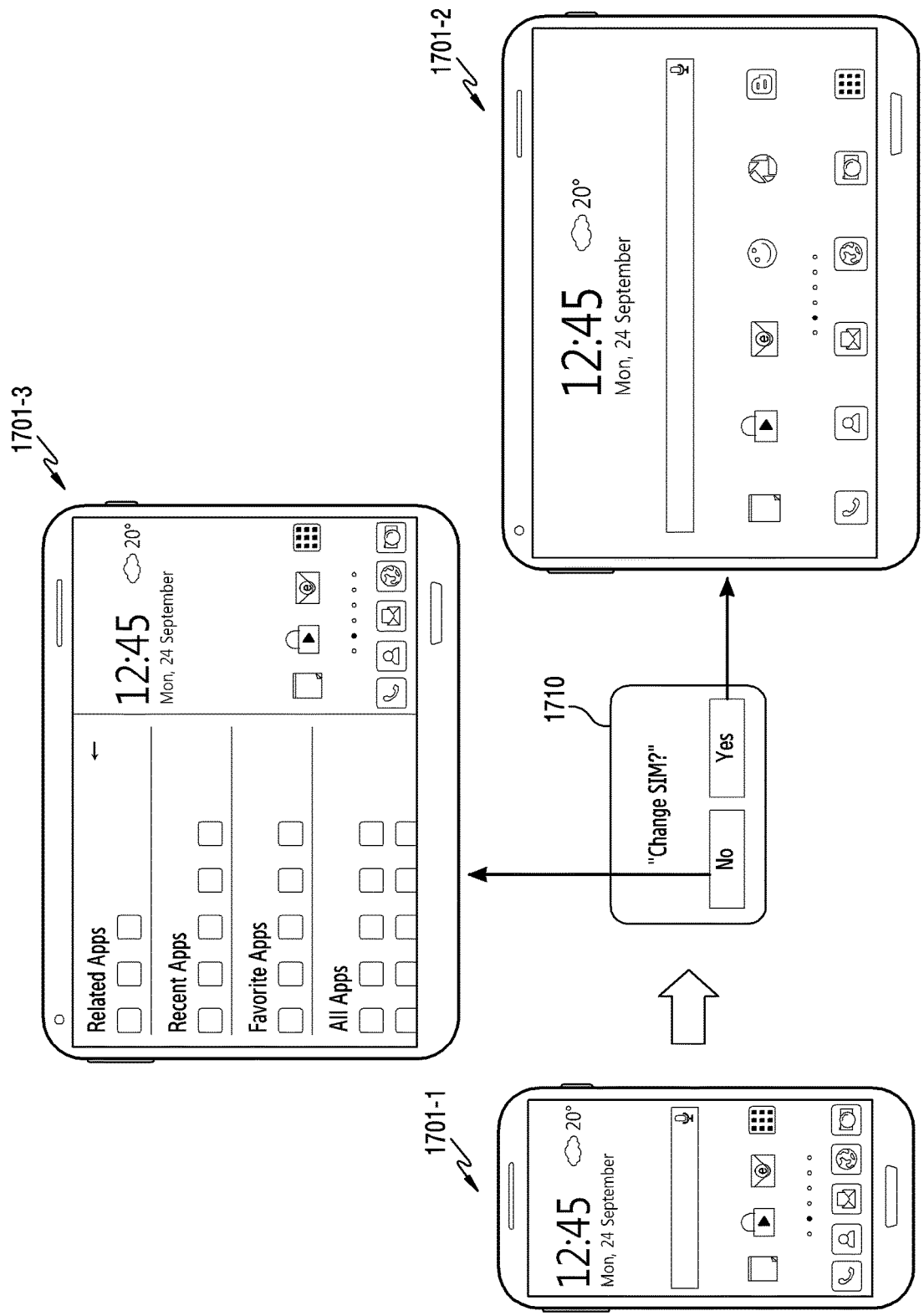
FIG. 17 is a view illustrating a process of determining a subscriber identifier module (SIM) to be used in the electronic device according to a change of a form of the electronic device according to various embodiments of the present disclosure.

FIG. 17 illustrates a process of determining a SIM to be used in the electronic device according to a change of a form of the electronic device 201 according to various embodiments of the present disclosure.

The electronic device 201 may perform discrimination and authentication of the electronic device 201 within a communication network by using the subscriber identity module (for example, a SIM card) 224a, 224b. The subscriber identity module 224a, 224b may include a card or an embedded SIM including a subscriber identity module, and may include unique identification information (for example, ICCID) or subscriber information (for example, IMSI).

As shown in FIG. 2, the electronic device 201 may include the plurality of SIMs 224a, 224b. The user may change a SIM currently used in the electronic device 201 to another SIM. For example, when a first SIM 224a is currently used in the electronic device 201, the user may change the SIM to be used in the electronic device 201 from the first SIM 224a to a second SIM 224b through a UI. The UI for changing the SIM may be, for example, a UI receiving an input through a touch screen. The first SIM 224a and the second SIM 224b may include different unique identification information and subscriber information. Accordingly, the electronic device 201 may be recognized as quite another user over the communication network according to what the SIM currently used in the electronic device 201 is. For example, the electronic device 201 having the second SIM 224b mounted therein cannot receive a call for a phone number corresponding to the first SIM. In addition, communication networks that the first SIM 224a and the second SIM 224b can access may be different from each other.

The user may need to change the SIM of the electronic device 201 to smoothly communicate. For example, when the user moves between a plurality of countries, the user should change the SIM to access a communication network available in each country since communication networks that can be used by communication operators in the respective countries may be different. In addition, the user may need to change the SIM of the electronic device 201 to be identified as a different user regarding the same communication network.

As described above, the electronic device 201 may include the plurality of SIMs, and the user may need to change the SIM to be used in the electronic device 201. Similarly to the method of changing the account logged on to the electronic device 201 in response to the change of the form of the electronic device 201, the electronic device 201 may change the SIM to be used in the electronic device 201 in response to the change of the form of the electronic device 201 as shown in FIG. 17. In FIG. 17, it is assumed that the form of the electronic device 201 is changed from the phone form of the bar type to the tablet form. However, this is just for convenience of explanation, and the electronic device 201 may be changed from a certain form to another form.

The user may change the form of the electronic device 201 to the tablet form by spreading the electronic device 201. The state detection sensor 240N of the electronic device 201 may detect such a change of the form of the electronic device 201. For example, the state detection sensor 240N may detect the change of the form of the electronic device 201 by measuring a spreading angle of the electronic device 201 or measuring a spreading curvature.

The processor 210 may change the SIM regarding the electronic device 201 in response to the change of the form of the electronic device 201 being detected. To achieve this, a SIM change mode similar to the account change mode of FIG. 8 regarding the electronic device 201 may be defined. The SIM change mode refers to a mode in which the SIM regarding the electronic device 201 is changed in response to the change of the form of the electronic device 201. When the user changes the form of the electronic device 201 with the SIM change mode being activated, the processor 210 may change the SIM regarding the electronic device 201 in response to the change of the form being detected. Alternatively, when the user changes the form of the electronic device 201 with the SIM change mode being inactivated, the processor 210 may not change the SIM regarding the electronic device 201 although the change of the form is detected. The activation or inactivation of the SIM change mode may be displayed through a UI including a button indicating whether the SIM change mode is activated as the UI 800 of FIG. 8. In addition, the user may directly control whether to activate the SIM change mode by touching the button indicating whether the SIM change mode is activated.

A state 1701-1 is a state in which the current SIM regarding the electronic device 201 is the first SIM 224a. When the electronic device 201 detects a change of the form of the electronic device 201 with the SIM change mode being activated, the processor 210 may change the SIM regarding the electronic device 201 in response to the detection. For example, the SIM regarding the electronic device 201 may be changed from the first SIM 224a to the second SIM 224b. The electronic device 201 may be recognized as a different electronic device from the electronic device 201 using the first SIM 224a over the communication network, based on the second SIM 224b. In addition, the electronic device 201 may access a communication network where the first SIM 224a is not available, based on the second SIM 224b.

When the SIM change mode is activated, the processor 210 may directly change the SIM regarding the electronic device 201 in response to the state detection sensor 240N detecting the change of the form of the electronic device 201. However, the processor 210 may allow the user to determine whether to change the SIM regarding the electronic device 201 in response to the change of the form of the electronic device 201 being detected. For example, the processor 210 may control the display 260 to display a pop-up 1710 including a message saying "Change SIM?" in response to the state detection sensor 240N detecting the change of the form of the electronic device 201. The pop-up 1710 may additionally include an interface to accept the account change. For example, when the user touches the button of "Yes" displayed on the pop-up 1710 through the display as shown in FIG. 17, the SIM regarding the electronic device 201 may be changed from the first SIM 224a to the second SIM 224b (state 1701-2). However, when the user touches the button of "No" displayed on the pop-up 910 through the display, the form of the electronic device 201 may be changed to the tablet form, but the processor 210 may maintain the SIM regarding the electronic device 201 as the first SIM 224a (state 1701-3). In other words, even when the user changes the form of the electronic device 201 with the SIM change mode being activated in the electronic device 201, the processor 210 may not change the SIM regarding the electronic device 201 according to a user's section.

In the example illustrated in FIG. 17, the UI of the electronic device 201 varies according to whether the SIM is changed. However, according to another embodiment, the same UI may be provided regardless of whether the SIM is changed.

Figure 18:
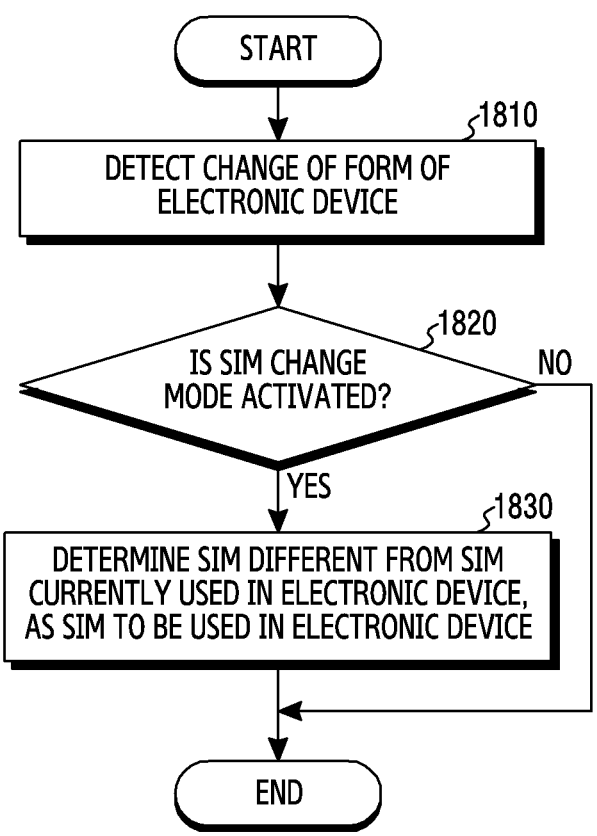
FIG. 18 is a flowchart for determining a SIM to be used in the electronic device according to a change of a form of the electronic device according to various embodiments of the present disclosure.

FIG. 18 is a flowchart for determining a SIM to be used in the electronic device 201 according to a change of a form of the electronic device 201 according to various embodiments of the present disclosure.

The processor 210 controls the state detection sensor 250N to detect a change of a form of the electronic device 201 (step 1810). The state detection sensor 240N of the electronic device 201 may detect such a change of the form of the electronic device 201. For example, the state detection sensor 240N may detect the change of the form of the electronic device 201 by measuring a spreading angle of the electronic device 201 or measuring a spreading curvature.

The processor 210 may determine whether a SIM change mode is activated (step 1820). The SIM change mode refers to a mode in which the SIM regarding the electronic device 201 is changed in response to the change of the form of the electronic device 201.

When the SIM change mode is activated, the processor 210 may change the SIM to be used in the electronic device 201 in response to the change of the form being detected (step 1830). On the other hand, when the SIM change mode is not activated, the processor 210 may not change the SIM to be used in the electronic device 201 in response to the change of the form being detected. Even when the SIM change mode is activated, the electronic device 201 may control the display 260 to display a pop-up (for example, the pop-up 1710 of FIG. 17) and to allow the user to determine whether to change the SIM, and may not change the SIM regarding the electronic device 201 based on an input received from the user through the pop-up, although it is not illustrated.

According to the present disclosure, when the electronic device 201 detects that the form of the electronic device 201 is changed, the electronic device 201 may change an account logged on to the electronic device 201 to another account. For example, when the electronic device 201 detects that the form of the electronic device 201 is changed from a first form to a second form, the electronic device 201 may change the account logged on to the electronic device 201 from a first account to a second account. The first form may be the phone form like the form 301-1 of FIG. 3, and the second form may be the tablet form like the form 301-2 of FIG. 3. Alternatively, the first form may be the tablet form as in the electronic device 301-2 of FIG. 3, and the second form may be the phone form like the form 301-1 of FIG. 3. The respective forms corresponding to the first form and the second form described above are merely an example, and the first form and the second form may be certain forms which are different from each other. The first account and the second account may be accounts that are logged on to the electronic device 201 when the electronic device is the first form or the second form. The user may set or change a configuration regarding each account, and accordingly, a configuration corresponding to the first account and a configuration corresponding to the second account may be different.

The user may change the form of the electronic device 201 to the second form while performing a specific task on the electronic device 201 of the first form. For example, the user may change the form of the electronic device 201 to the second form while viewing a video or listening to the music on the electronic device 201 of the first form. The electronic device 201 may display a UI based on the configuration corresponding to the second account, in the second form. Accordingly, the electronic device 201 may display a content having nothing to do with the specific task performed in the first form through the UI.

The user may restore the form of the electronic device 201 from the second form to the first form. In this case, the user may want to continue performing the specific task performed on the electronic device of the original first form. For example, when the user changes the form of the electronic device 201 to the second form while viewing a video on the electronic device 201 of the first form, and then changes the electronic device 201 of the second form back to the first form, the user may want to continue viewing the previous video. To achieve this, the electronic device 201 according to the present disclosure may store information regarding the application that has been performed in the electronic device 201 before the form is changed. When the application is an application for replaying a video or music, the information regarding the application may include information regarding a replaying time, a sound volume, an image resolution, or the like when the form change is detected. When the form of the electronic device 201 is restored, the electronic device 201 may load the information regarding the application stored, and may provide a content corresponding to the loaded information. For example, according to the information regarding the application, the electronic device 201 may replay the video or music that has been replayed before the form of the electronic device 201 is changed from the first form to the second form, in the first form from where the video or music left off.

In addition, the electronic device 201 according to the present disclosure may process an interrupt with respect to different accounts logged on to the electronic device 201 of different forms. For example, while the user performs a task by using the electronic device 201 of the second form to which the second account is logged on, the electronic device 201 may receive information regarding the first account. The information regarding the first account may be, for example, a message, a voice call, or various notification services that can be identified only in the first account. When the electronic device 201 receives the information regarding the first account when the user performs the task by using the electronic device 201 of the second form to which the second account is logged on, the electronic device 201 may display the information regarding the first account on the display 260, or may not inform the user. In other words, when the electronic device 201 receives the information regarding the first account with the second account being logged on, the electronic device 201 may be recognized as not receiving any information. Instead, the electronic device 201 may store the information regarding the first account in the memory, and may display the information regarding the first account on the display 260 or may inform the user when the form of the electronic device 201 is changed to the first form and the first account is logged on. However, even when the form of the electronic device 201 is changed, the account logged on to the electronic device 201 may not be changed. Therefore, in this case, the electronic device 201 may not display the information regarding the first account on the display 260, and may not inform the user.

Figure 19:
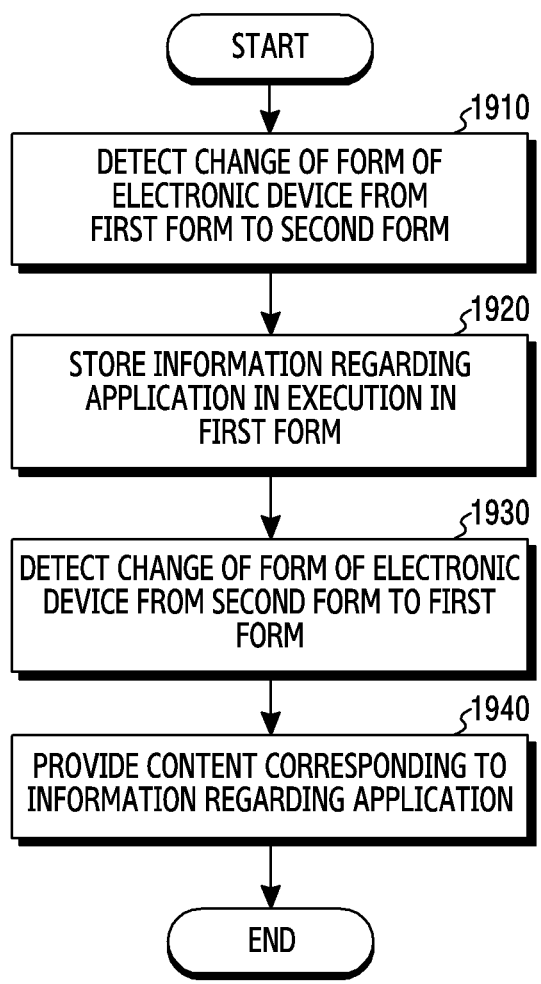
FIG. 19 is a flowchart for displaying a content corresponding to an application related to an original form as the form of the electronic device is restored according to various embodiments of the present disclosure.

FIG. 19 is a flowchart for displaying a content corresponding to an application related to an original form as the form of the electronic device is restored according to various embodiments of the present disclosure.

The processor 210 controls the state detection sensor 240N to detect the change of the form of the electronic device 201 from the first form to the second form (step 1910). The state detection sensor 240N of the electronic device 201 may detect whether the electronic device 201 is folded, bent, rolled, or spread by measuring a spreading angle or a spreading curvature of the electronic device 201.

Prior to changing an account logged on to the electronic device 201 in response to the change of the form being detected, the processor 210 may control the memory 230 to store information regarding an application which is being executed in the first form (step 1920). For example, when the application is an application for replaying a video or music, the information regarding the 20 application may include information regarding a replaying time, a sound volume, an image resolution, or the like when the form change is detected.

The processor 210 may control the state detection sensor 240N to detect the change of the form of the electronic device 201 from the second form to the 25 first form (step 1930). In other words, the processor 210 may control the state detection sensor 240N to detect that the form of the electronic device 201 is restored to the first form.

The processor 210 provides a content corresponding to the information 30 regarding the application executed in the first form (step 1940). For example, the processor 210 may identify the information regarding the application stored in response to the form change from the first form when the change from the second form to the first form is detected. According to the information regarding the application, the processor 210 may continue replaying the video or music that has been replayed before the form of the electronic device 201 is changed from the first form to the second form, in the restored first form from where the video or music left off.

The term "module" used herein may refer to a unit including hardware, software, or firmware, and for example, may be interchangeably used with the terms "logic," "logical block," "component" or "circuit". The "module" may be an integrally configured component, or a minimum unit performing one or more functions or a part thereof. The "module" may be implemented mechanically or electronically. For example, the "module" may include an application-specific IC (ASIC) chip, a field-programmable gate array (FPGA), and a programmable-logic device for performing some operations, which are known or will be developed.

At least part of a device (for example, modules or functions thereof) or a method (for example, operations) according to various embodiments, for example, may be implemented by instructions stored in a computer-readable storage medium (for example, the memory 130) in the form of a program module. When the instruction is executed by a processor (for example, the processor 120), the processor may perform a function corresponding to the instruction. The computer-readable recording medium may include a hard disk, a floppy disk, magnetic media (for example, a magnetic tape), optical media (for example, compact disc read only memory (CD-ROM) and a digital versatile disc (DVD), magneto-optical media (for example, a floptical disk)), or an internal memory. Also, the instruction may include a code generated by a compiler or a code executable by an interpreter. The module or program module according to various embodiments may include one or more of the above-described elements, some element may be omitted, or other element(s) may further be included.

The embodiments disclosed in the present disclosure are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure.

What is claimed is:

1. An operation method of an electronic device, the operation method comprising:
   detecting change of a form of the electronic device between a first form in which a first portion of a touchscreen display of the electronic device is exposed for use and a second portion of the touchscreen display is hidden and a second form in which the first portion and the second portion of the touchscreen display are both exposed for use;
   identifying, from among a plurality of accounts, a first account for use in the second form of the electronic device, based on detecting change of the form of the electronic device from the first form to the second form, or a second account for use in the first form of the electronic device, based on detecting change of the form of the electronic device from the second form to the first form, each account of the plurality of accounts being associated with a different form for using the electronic device and having a user interface (UI) configuration corresponding thereto;
   identifying the user interface (UI) configuration corresponding to the identified account; and
   displaying a UI, based on the identified UI configuration.

2. The operation method of claim 1, further comprising:
   based on an account change mode being active and the electronic device being logged into the first account when the change of the form of the electronic device from the second form to the first form is detected:
   logging into the second account,
   wherein the first form is a phone form and the second form is a tablet form.

3. The operation method of claim 2, wherein the second account is a default account and the method further comprises:
   logging into the second account, regardless of whether the account change mode is active, based on detecting the change of form of the electronic device from the second form to the first form.

4. The operation method of claim 1, wherein the UI configuration comprises at least one of information regarding authority to use applications stored in the electronic device, information regarding arrangements and types of the applications displayed on the electronic device through the UI, information regarding a screen configuration regarding the electronic device, information regarding contents provided through the applications, or information regarding versions of the applications.

5. The operation method of claim 1, further comprising:
   changing a mode regarding the electronic device, based on detecting change of the form of electronic device,
   wherein the mode comprises information regarding a screen configuration.

6. The operation method of claim 1, further comprising:
   displaying a message indicating the plurality of accounts, based on detecting the change of the form of the electronic device,
   wherein the identifying of the account comprises selecting one or more accounts from the plurality of accounts.

7. The operation method of claim 1, further comprising:
   storing information regarding an application which is executed in the first form of the electronic device, based on detecting change of the form for using the electronic device from the first form to the second form; and
   providing content corresponding to the stored information regarding the application, based on detecting change of the form of the electronic device from the second form to the first form.

8. The operation method of claim 1, further comprising:
   adjusting an account of the electronic device into the identified account.

9. The operation method of claim 1, further comprising:
   adding another account to a current account regarding the electronic device.

10. An electronic device comprising:
    a sensor;
    a touchscreen display; and
    at least one processor configured to:
    detect, using the sensor, change of a form of the electronic device between a first form in which a first portion of the touchscreen display is exposed for use and a second portion of the touchscreen display is hidden and a second form in which the first portion and the second portion of the touchscreen display are both exposed for use;
    identify, from among a plurality of accounts, a first account for use in the second form of the electronic device, based on detecting change of the form of the electronic device from the first form to the second form, or a second account for use in the first form of the electronic device, based on detecting change of the form of the electronic device from the second form to the first form, each account of the plurality of accounts being associated with a different form for using the electronic device and having a user interface (UI) configuration corresponding thereto;
identify the user interface (UI) configuration corresponding to the identified account; and
display a UI, based on the identified UI configuration.

11. The electronic device of claim 10, wherein the at least one processor is configured to:
based on an account change mode being active and the electronic device being logged into the first account when the change of the form of electronic device from the second form to the first form is detected:
log into the second account,
wherein the first form is a phone form and the second form is a tablet form.

12. The electronic device of claim 11, wherein the second account is default account and the at least one processor is configured to:
log into the second account, regardless of whether the account change mode is active, based on detecting the change of form of the electronic device from the second form to the first form.

13. The electronic device of claim 10, wherein the UI configuration comprises at least one of information regarding authority to use applications stored in the electronic device, information regarding arrangements and types of the applications displayed on the electronic device, information regarding a screen configuration regarding the electronic device, information regarding contents provided through the applications, or information regarding versions of the applications.

14. The electronic device of claim 10, wherein the at least one processor is configured to:
change a mode regarding the electronic device, based on detecting change of the form of the electronic device,
wherein the mode comprises information regarding a screen configuration.

15. The electronic device of claim 10, wherein the at least one processor is configured to:
display a message indicating the plurality of accounts, based on detecting change of the form of the electronic device,
wherein the identifying of the account is based on a selection of one or more accounts from the plurality of accounts.

16. The electronic device of claim 10, wherein the at least one processor is configured to:
store information regarding an application which is executed in the first form of the electronic device, based on detecting change of the form for using the electronic device from the first form to the second form; and
provide content corresponding to the stored information regarding the application, based on detecting change of the form of the electronic device from the second form to the first form.

17. The electronic device of claim 10, wherein the at least one processor is configured to adjust an account of the electronic device into the identified account.

18. The electronic device of claim 10, wherein the at least one processor is configured to add another account to a current account regarding the electronic device.

19. An electronic device comprising:
a sensor;
a touchscreen display;
a communication interface; and
at least one processor configured to:
detect, using the sensor, change of a form of the electronic device between a first form in which a first portion of the touchscreen display is exposed for use and a second portion of the touchscreen display is hidden and a second form in which the first portion and the second portion of the touchscreen display are both exposed for use; and
identify, from among a plurality of subscriber identity modules, a first subscriber identity module (SIM) for use in the second form of the electronic device based on detecting change of the form of the electronic device from the first form to the second form, or a second SIM for use in the first form of the electronic device, based on detecting change of the form of the electronic device from the second form to the first form, each SIM of the plurality of SIMs being associated with a different form for using the electronic device; and
control the communication interface to communicate through a network accessible by the identified SIM.

* * * * *